May 28, 1957 H. C. SIBLEY 2,794,179

ELECTRONIC CODE COMMUNICATION SYSTEM

Filed Dec. 30, 1955 16 Sheets-Sheet 1

INVENTOR.
H. C. SIBLEY
BY Forest B. Hitchcock
HIS ATTORNEY

May 28, 1957 H. C. SIBLEY 2,794,179

ELECTRONIC CODE COMMUNICATION SYSTEM

Filed Dec. 30, 1955 16 Sheets-Sheet 2

INVENTOR.
H. C. SIBLEY
BY Forest B. Hitchcock
HIS ATTORNEY

STATION NO.1.

INVENTOR.
H.C. SIBLEY
BY
Forest B. Hitchcock
HIS ATTORNEY

INVENTOR.
H. C. SIBLEY
BY Forest B. Hitchcock
HIS ATTORNEY

INVENTOR.
H. C. SIBLEY
BY Forest B. Hitchcock
HIS ATTORNEY

May 28, 1957 H. C. SIBLEY 2,794,179

ELECTRONIC CODE COMMUNICATION SYSTEM

Filed Dec. 30, 1955 16 Sheets-Sheet 6

INVENTOR.
H. C. SIBLEY
BY Forest B. Hitchcock
HIS ATTORNEY

INVENTOR.
H.C. SIBLEY
BY Forest B. Hitchcock
HIS ATTORNEY

INVENTOR.
H. C. SIBLEY
BY Forest B. Hitchcock
HIS ATTORNEY

INVENTOR.
H. C. SIBLEY
BY *Forest B. Hitchcock*
HIS ATTORNEY

May 28, 1957 H. C. SIBLEY 2,794,179

ELECTRONIC CODE COMMUNICATION SYSTEM

Filed Dec. 30, 1955 16 Sheets-Sheet 10

INVENTOR.
H. C. SIBLEY
BY
Forest B. Hitchcock
HIS ATTORNEY

INVENTOR.
H. C. SIBLEY
BY Forest B. Hitchcock
HIS ATTORNEY

May 28, 1957 H. C. SIBLEY 2,794,179

ELECTRONIC CODE COMMUNICATION SYSTEM

Filed Dec. 30, 1955 16 Sheets-Sheet 12

INVENTOR.
H. C. SIBLEY
BY Forest B. Hitchcock
HIS ATTORNEY

INVENTOR.
H. C. SIBLEY
BY Forest B. Hitchcock
HIS ATTORNEY

May 28, 1957 H. C. SIBLEY 2,794,179

ELECTRONIC CODE COMMUNICATION SYSTEM

Filed Dec. 30, 1955 16 Sheets-Sheet 14

INVENTOR.
H.C. SIBLEY
BY Forest B. Hitchcock
HIS ATTORNEY

May 28, 1957 H. C. SIBLEY 2,794,179

ELECTRONIC CODE COMMUNICATION SYSTEM

Filed Dec. 30, 1955 16 Sheets-Sheet 15

INVENTOR.
H. C. SIBLEY
BY
Forest B. Hitchcock
HIS ATTORNEY

May 28, 1957 H. C. SIBLEY 2,794,179

ELECTRONIC CODE COMMUNICATION SYSTEM

Filed Dec. 30, 1955 16 Sheets-Sheet 16

INVENTOR.
H. C. SIBLEY
BY Forest B. Hitchcock
HIS ATTORNEY

United States Patent Office 2,794,179

Patented May 28, 1957

2,794,179

ELECTRONIC CODE COMMUNICATION SYSTEM

Henry C. Sibley, Spencerport, N. Y., assignor to General Railway Signal Company, Rochester, N. Y.

Application December 30, 1955, Serial No. 556,492

10 Claims. (Cl. 340—163)

This invention relates to an electronic, pulse-type code communication system. More particularly, it pertains to a communication system for use in railway signaling to transfer information about track occupancy and the conditions of switches, signals and other devices as required from a plurality of field stations to a central office.

The high speed of operation possible with an electronic system and obtainable without the mechanical movement and resultant wear that occurs in relay type systems makes it practical to provide a continuous scanning system. In such a system, all the indications from the various stations are transmitted in succession to the central office once during each cycle of operation and with one cycle following another continuously. Since the scanning occurs at a rapid rate, the indications displayed at the central office always represent substantially fresh information.

In a scanning type of communication system, the indication code for any field station is identified as belonging to that station merely by its place in the complete cycle of operation. As a result, it is not necessary to transmit information about the identity of each station as it sends its indication code, although this is ordinarily required in code communication systems of the kind in which each station transmits only when it has a new indication to send to the central office.

One objection in the past to the use of electronic systems for railway signaling has been that they have required excessive amounts of power and this is particularly objectionable with regard to the apparatus used at a field station where commercial power sources are often not available or are not sufficiently reliable to be used as the only source of power. To overcome this objection, the code communication of this invention is organized to provide highly reliable operation with low power requirements, particularly at the various field stations. This has been brought about in part through the use of various circuit organizations using cold cathode glow tubes which do not require any filament heating power. Cold cathode tubes are used not only for counting purposes and for storage of indications, but also in various pulse generating and timing circuits.

Described briefly, and without any attempt to define it in its exact terms, the invention comprises in one of its forms a plurality of field stations each connected to a central office over a pair of line wires. During a cycle of operation, each station in its allotted time in the cycle sends a series of pulses comprising the indication information from that station to the central office. Each station preferably transmits its code pulses at the same preselected rate. To accomplish this, a stream of timing pulses is transmitted from the central office during each cycle. These pulses are received at each field station and establish, by their repetition rate, the rate at which the indication pulses are transmitted to the central office. Each field station is thus "driven" by these pulses received from the central office.

In one embodiment of this invention, the pulses transmitted from the central office to the field stations and also those transmitted from each field station to the central office comprises intervals of approximately five milliseconds each during which a distinctive carrier frequency is transmitted followed by a rest period of the same length in which no carrier is transmitted. Thus, each "pulse period" allotted to the transmission of a single code character is approximately ten milliseconds long. Actually, either of two distinctive characters can be transmitted on any pulse period. For one kind of code character, a particular frequency is transmitted in the manner just described; a different kind of character is transmitted by slightly shifting the frequency of the carrier wave on that pulse period. Interference between the incoming and outgoing transmissions is avoided by having the transmissions from the central office to the field stations occur on one preselected frequency channel, while each field station transmits its indications to the central office on a different distinctive frequency channel.

The transmission of pulses between the central office and the field stations can be accomplished by keying a carrier transmitter and sending the resulting pulses over a pair of line wires connecting the office with each field station. Or, if desired, the codes may be transmitted by space radio in any desired manner such as by frequency modulation, pulse position modulation, or the like.

Each station must transmit its indications only during the time period in the cycle allotted to that station. To accomplish this, there is periodically inserted in the stream of timing pulses transmitted from the central office, a distinctive pulse called a station-call pulse. This pulse can be made distinctive from the timing pulses by shifting slightly the frequency of the transmitted carrier as previously described. Each field station has means for recognizing the special station-call pulses and counting them to determine when in the cycle it should transmit its indication code. As an example, field station No. 10 becomes gated to transmit its indication code pulses upon having counted ten station-call pulses; its indication pulses are then transmitted at the rate of the timing pulses received during the interval or "station period" lasting from this tenth station-call pulse until the arrival of the eleventh station-call pulse.

To store the indications at the central office, banks of storage units are provided, generally one for each field station. Each bank includes a number of dual state storage devices, one for each of the ten pulse periods in the code from that station. Each of these devices can be operated to one condition or the other dependent upon the kind of code character received on the respective pulse period from the particular station corresponding to that bank. These banks of storage units are selectively gated in turn by a station counter so that each group of incoming indication pulses is, in effect, routed to the proper storage bank.

In one embodiment of this invention, each timing pulse transmitted from the central office comprises approximately five milliseconds of 6.75 kc. carrier transmission followed by an equal length interval when nothing is transmitted. A station-call pulse is similar except that the carrier frequency is then shifted to 6.25 kc. For transmitting an indication, either of two kinds of transmissions are made from a field station to the central office on each pulse period of code. For example, to indicate that a track switch is in its normal position, a 11.25 kc. carrier signal is transmitted for the first half of a pulse period demarcated by the received tuning pulses followed by an equal interval when no carrier is transmitted; to indicate that the switch is in its reverse position, the carrier frequency is shifted on that pulse period to a slightly different value such as 10.75 kc. Other frequency values may as well be used.

It is necessary that the counting circuits at each of the various field stations in the system start every cycle in their initial or zero conditions. To do this, the central office ceases to transmit the timing and station-call pulses for a brief interval at the end of each cycle and before the beginning of the next. This period of "silence" is detected at each field station and results in the restoration of all the counting circuits to their zero conditions.

Both station and step counting at the field stations and the central office is accomplished with step-by-step counters using a single, cold-cathode, grid-glow tube for each step or count. The indications received at the central office are stored in selectively gated banks of similar cold-cathode, grid-glow tubes. Various other pulse forming and gating circuits and the like also use cold cathode tubes.

Each field station transmits its indication code only during the interval between a particular pair of succesively occurring station-call pulses as selected by its station counting circuits. For field stations which are relatively close to the central office, the indication code is received at the central office with only a short amount of delay time with respect to the group of pulses generated at the office and intended for that particular station. For stations which are more remote, this delay time is increased. It has been determined that one of the principal reasons for such delay results from the electrical "inertia" of the various line filters that may be used. Thus, for stations sufficiently remote from the central office to require that carrier repeaters be provided to maintain the signal strength at the proper level, the delay time is considerably increased because of the additional filters associated with such a repeater location. For such remote field stations, it is then necessary that the station gating of the storage banks for the different stations at the central office be properly timed or phased with respect to the driving pulses transmitted to that station to ensure that the returned indication code will be effective only on its respective storage bank.

A considerable amount of such delay can be accommodated in the present system by the means disclosed in my prior co-pending application Ser. No. 485,973, filed February 3, 1955. The accommodation of such delay is disclosed therein as being accomplished by providing a station period at the central office which is somewhat longer than the time required for the transmission of all the indications for any one station. Thus, the interval between successive station-call pulses (station period) is twelve pulse periods long in one particular embodiment of this invention, but only ten of these pulse periods are utilized for the transmission of the indication code back to the control office. More specifically, the central office counting means which is effective to insert the station-call pulses in the cycle periodically is a scale-of-twelve pulse divider which is effective to cause a station-call pulse to be transmitted only for each twelfth pulse period. However, the step counter at each field station used to demarcate the pulse periods has a capacity of only ten counts. Therefore, only ten pulses, corresponding to the first ten pulse periods of a station period following the station-call pulse, are transmitted from each station. Since the station gate provided at the central office for each bank of storage devices is twelve pulse periods long, the indication code from any field station corresponding to only the first ten pulse periods of the station period can be considerably delayed in transmission and yet be received at the central office within the time limit of the corresponding station gate. Under such circumstances, the indication code for such station is effective only on the bank of storage devices associated with that station since only that particular bank will be properly gated to receive the indication pulses.

For field stations which are so remote from the central office that several repeaters are required to maintain comunication, the delay in the reception of an indication code becomes so great that it cannot properly be accommodated by the means described briefly above and in considerable detail in the above mentioned co-pending application. Therefore, the system of the present invention has been organized in such a manner that the station gate provided at the central office for any station may be delayed by a preselected amount relative to the group of pulses provided at the central office for that particular field station. The delay time can be made different for different field stations and is, in general, made greater for the more remote field stations which encounter the most loop delay. In any case, the delay is made such that the station gate effective on the respective storage bank will encompass only the time during which the indication code pulses are received from that station and not the time when pulses are received from some other station.

More specifically, in each place in a cycle of transmission where it is desired that additional delay time be added in the generation of the station gates, the station counter at the central office which is effective to keep track of the progress of the cycle causes the conditioning of one of a plurality of delay units. When any delay unit is thus conditioned, it is effective to cause all of the station gates from that point on in the cycle to be delayed by a specified amount. This delay time is an integral number of pulse periods as demarcated by the scale-of-twelve pulse divider previously described. At some later time in the cycle where it is desired to introduce additional delay time, the station counter is effective to condition still another delay unit. Such conditioning of this delay unit then causes each of the station gates to be delayed still more. Each increment of delay thus provided equals the duration of one or more pulse periods. In this way, definite time increments can be selectively added at will at various places in the cycle to delay the station gates. The station gating is thus precisely determined for each station and cannot drift as components age or temperatures vary since the delay time is always related to the basic timing means at the central office which acts as the "clock" for the entire system.

The apparatus at each field station has, in the present invention, been organized to provide all the required functions with a minimum of apparatus. Means has been provided to supply a positive cutting off of each station except for the brief interval in each cycle when it is to transmit its indication code. In addition, an improved circuit organization conveniently provides for a station to transmit indication codes on several successive station periods as desired. Thus, it becomes readily possible to transmit considerably more indications than can be provided for on the ten pulse periods allotted to a station during a single station period.

In addition, a check relay circuit organization is provided for the apparatus at each field station. This check relay is normally energized to indicate that the field station apparatus is in proper operation. This relay is deenergized, however, when any of various circuit faults occur at the field station. The dropping away of the relay then fully deenergizes the transmitter associated with that field station to prevent it from continually attempting to transmit and thereby disable the entire system. A time element relay is associated with the check relay and, after a predetermined interval, it attempts to restore the check relay to its normal condition. However, if proper operating conditions have not in the meantime been established, the check relay cannot be energized so that the station remains disabled. As a result, an improperly operating field station is quickly made inoperative, so that indications are not prevented from being received in the usual manner from all the remaining field stations.

The present invention discloses also an indicator panel for use with the system of this invention. This indicator panel is intended for use at the central office and is provided with a neon indicator lamp for each field station in the system. Upon reception of the tenth indication pulse from any field station at the central office, the indicator lamp associated with that station is briefly illuminated. In order for such tenth pulse to be received from a station, the step counter and station counters at such station must be properly operating as well as the receiver and transmitter at such station. In addition, the reception of such a pulse and the illumination of the corresponding indication lamp is also proof that the line wires are intact to that station. Consequently, the display provided by such an array of indication lamps quickly provides information as to the source of any trouble in the system.

It is, accordingly, an object of this invention to provide an electronic code communication system of the kind described having a variable delay in the station gating at the central office to provide for the proper gating of the indication storage banks so that the code from any station can be effective only on its respective storage bank even though it is considerably delayed.

Another object of this invention is to cause the delayed station gating to be subject to the pulse demarcating means at the central office so that the delay will be provided in predetermined, unvarying time increments.

Another object of this invention is to provide a code communication system having field station apparatus being readily effective to make the station inoperative except during the particular portion of the cycle intended for the transmission of indications from that station.

An additional object of this invention is to provide an electronic code communication system having check relay circuit means at each field station effective to disable that station in the event of a circuit fault and thus prevent such station from continuously transmitting and thus rendering the entire system inoperative.

Still another object of this invention is to provide indication means comprising a plurality of indication lamps, one for each field station, to indicate the proper reception of indications from the respective field stations.

Other objects, purposes, and characteristic features of this invention will in part be obvious from the accompanying drawings and in part pointed out as the description of the invention progresses.

In describing this invention in detail, reference will be made to the accompanying drawings in which those parts having similar features and functions are designated throughout the several views by like reference characters, and in which.

Figure 10A:
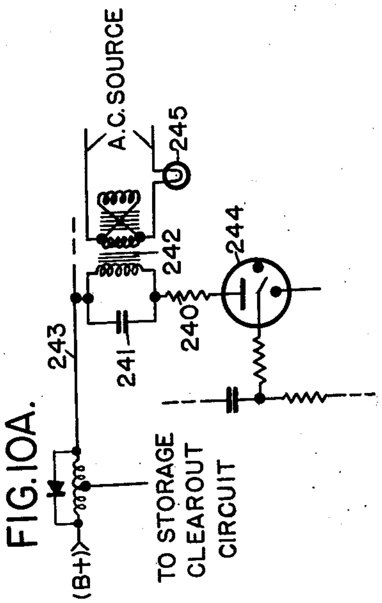
Figure 10B:
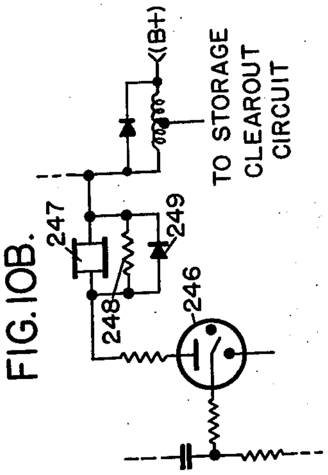
Figures 4A, 5:
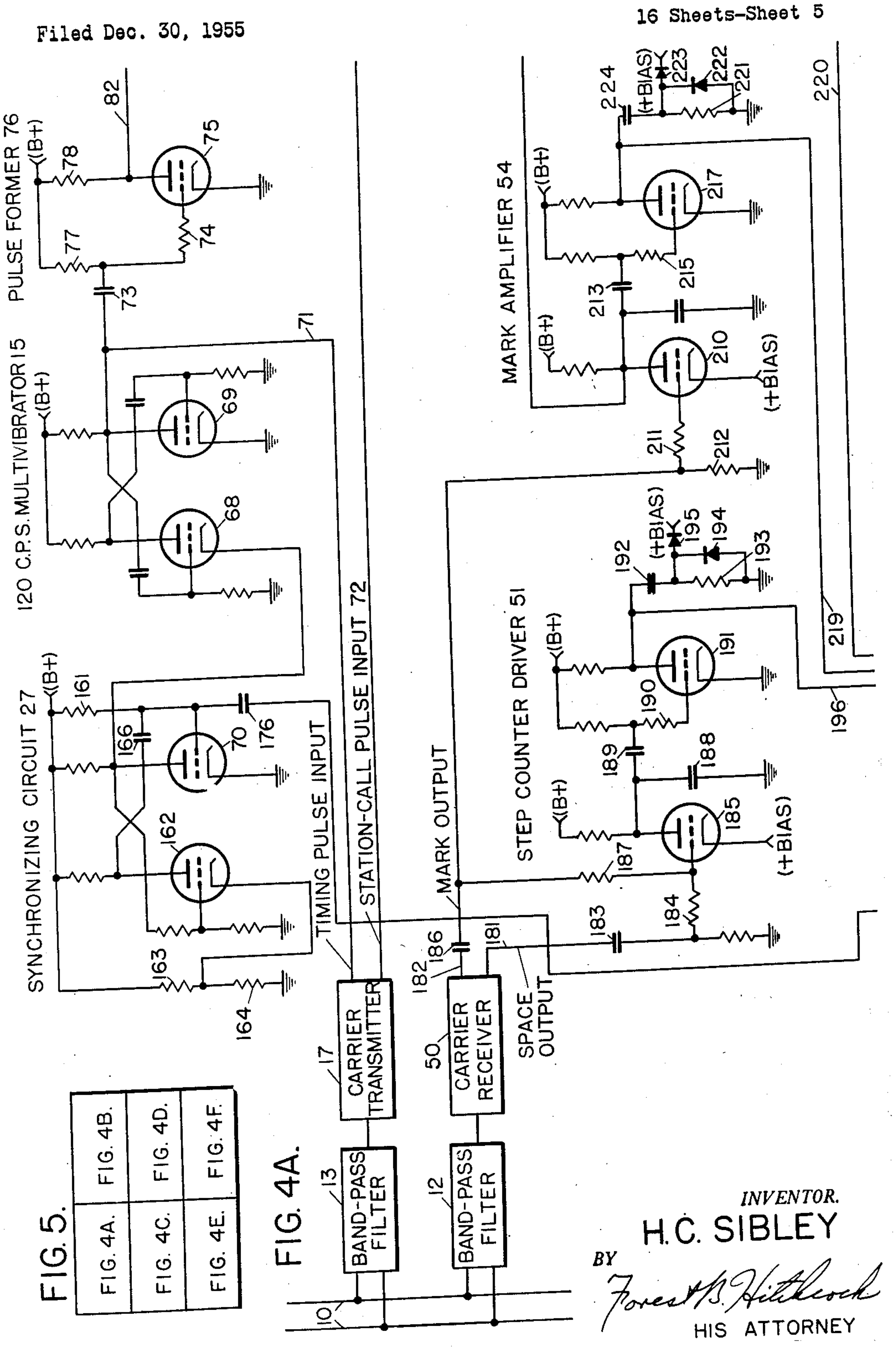
Figure 6:
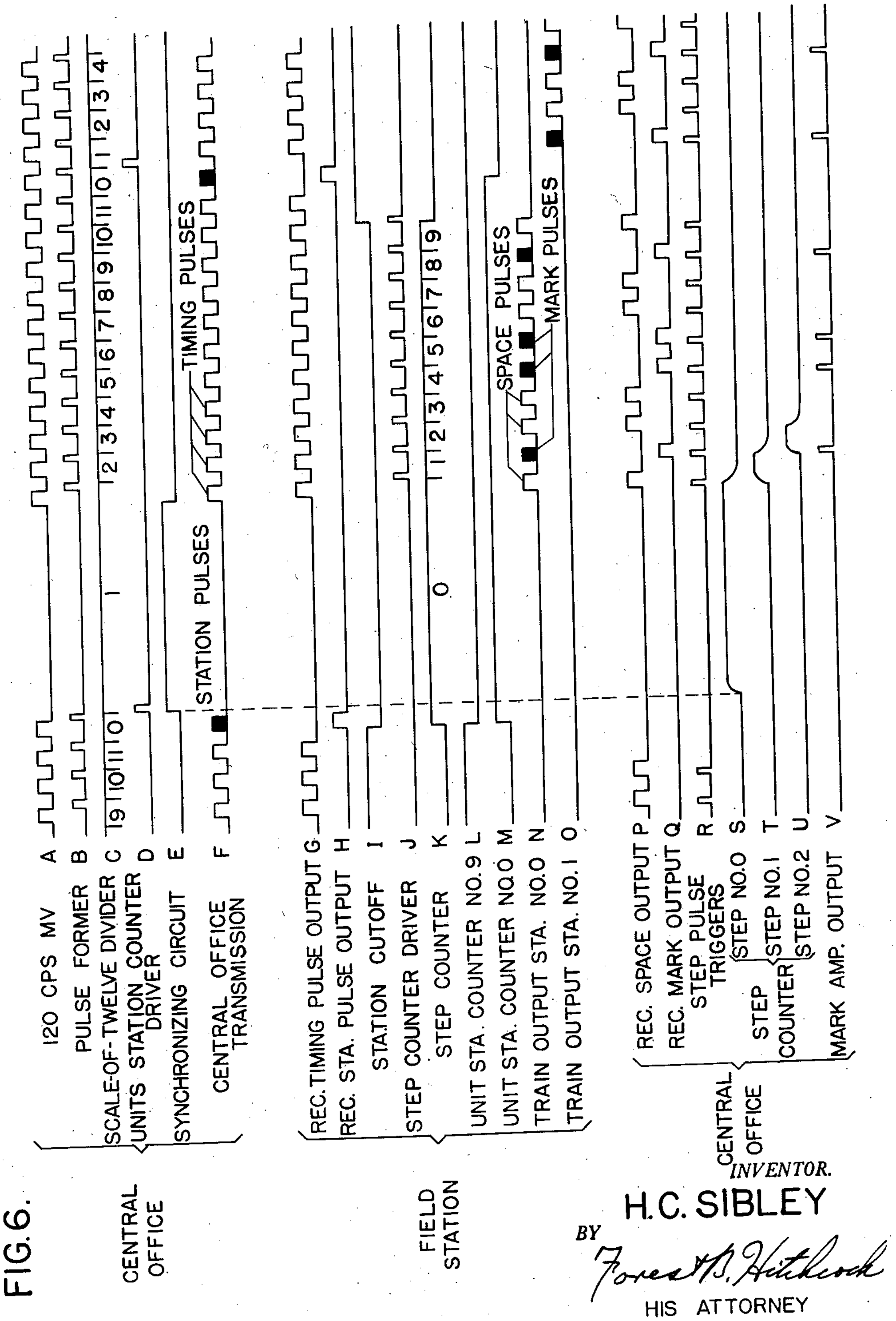
Figure 7:
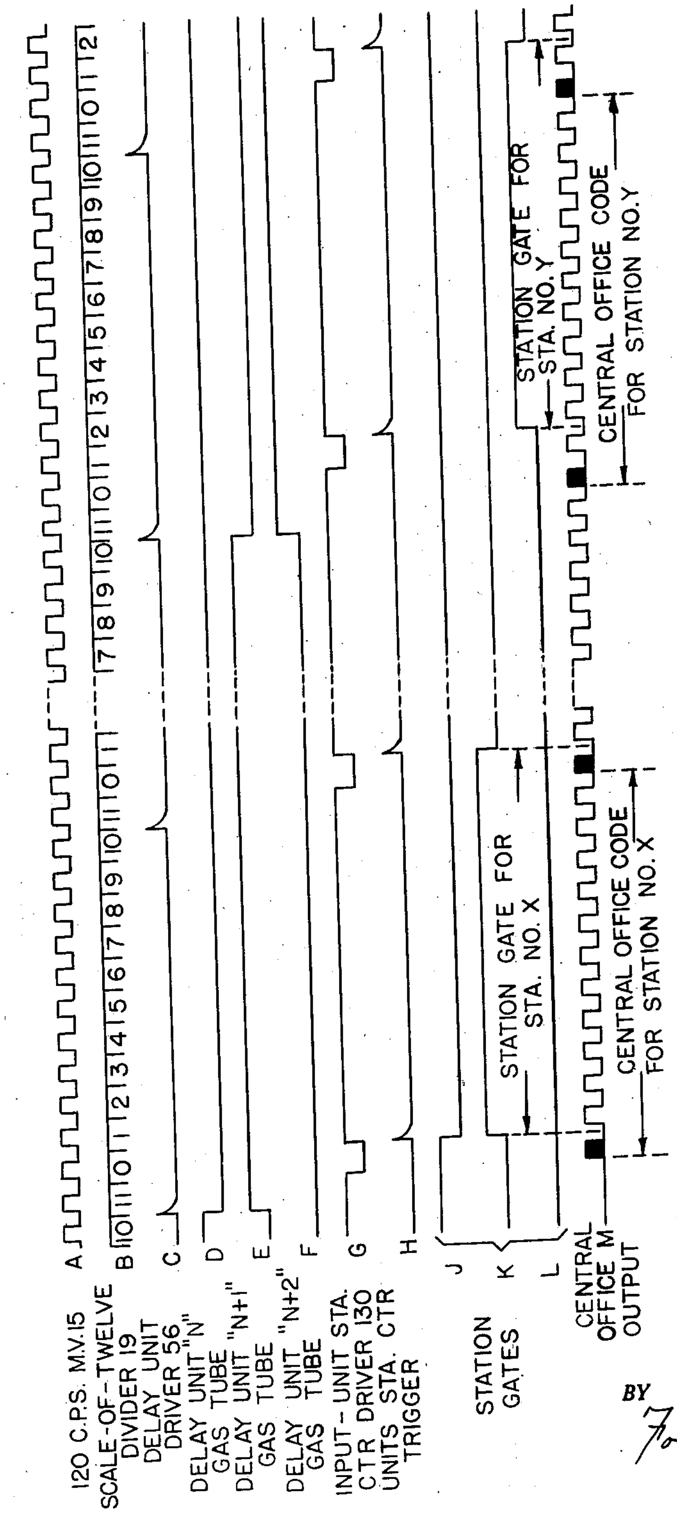
Figure 8A:
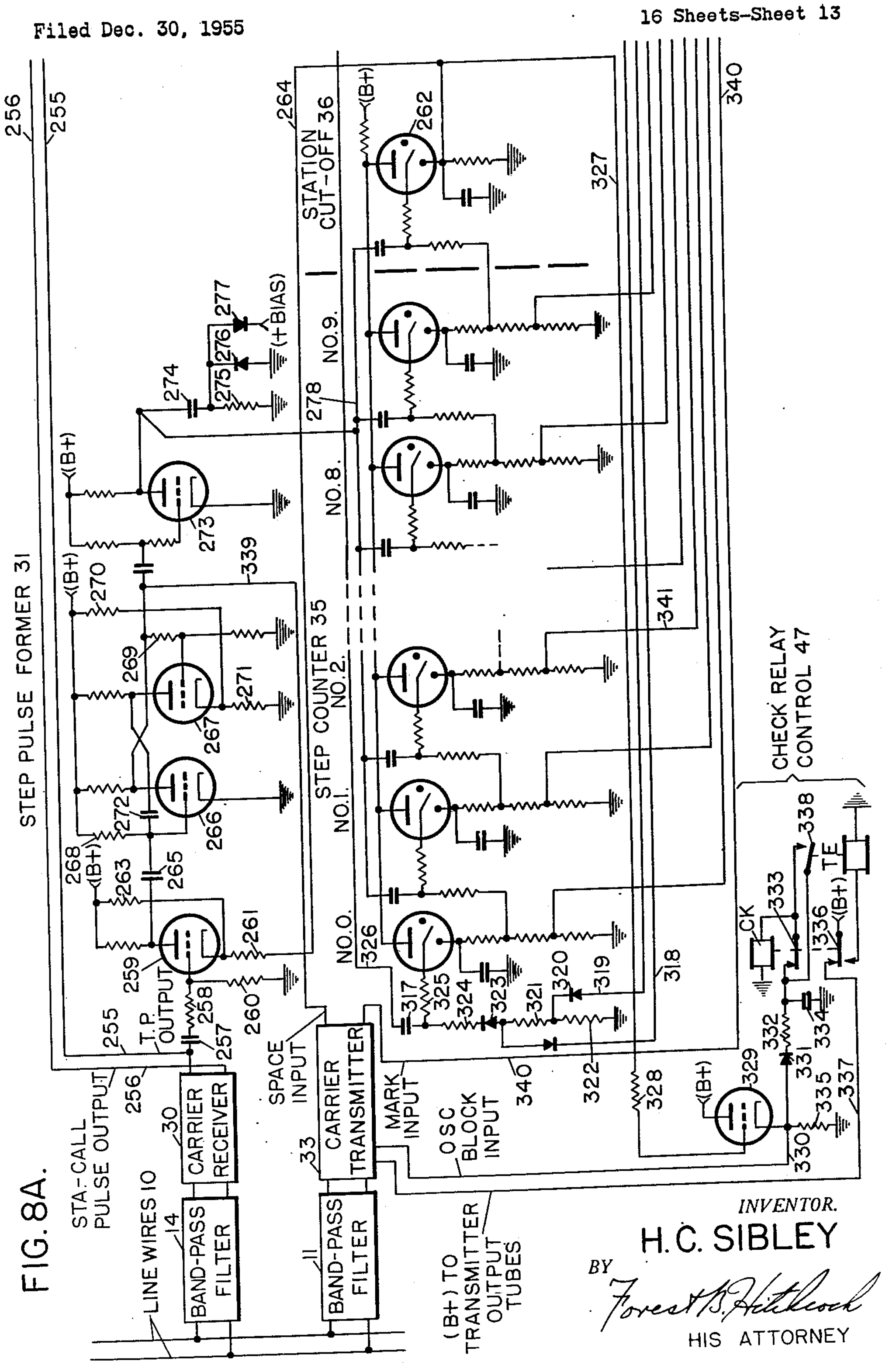
Figure 8B:
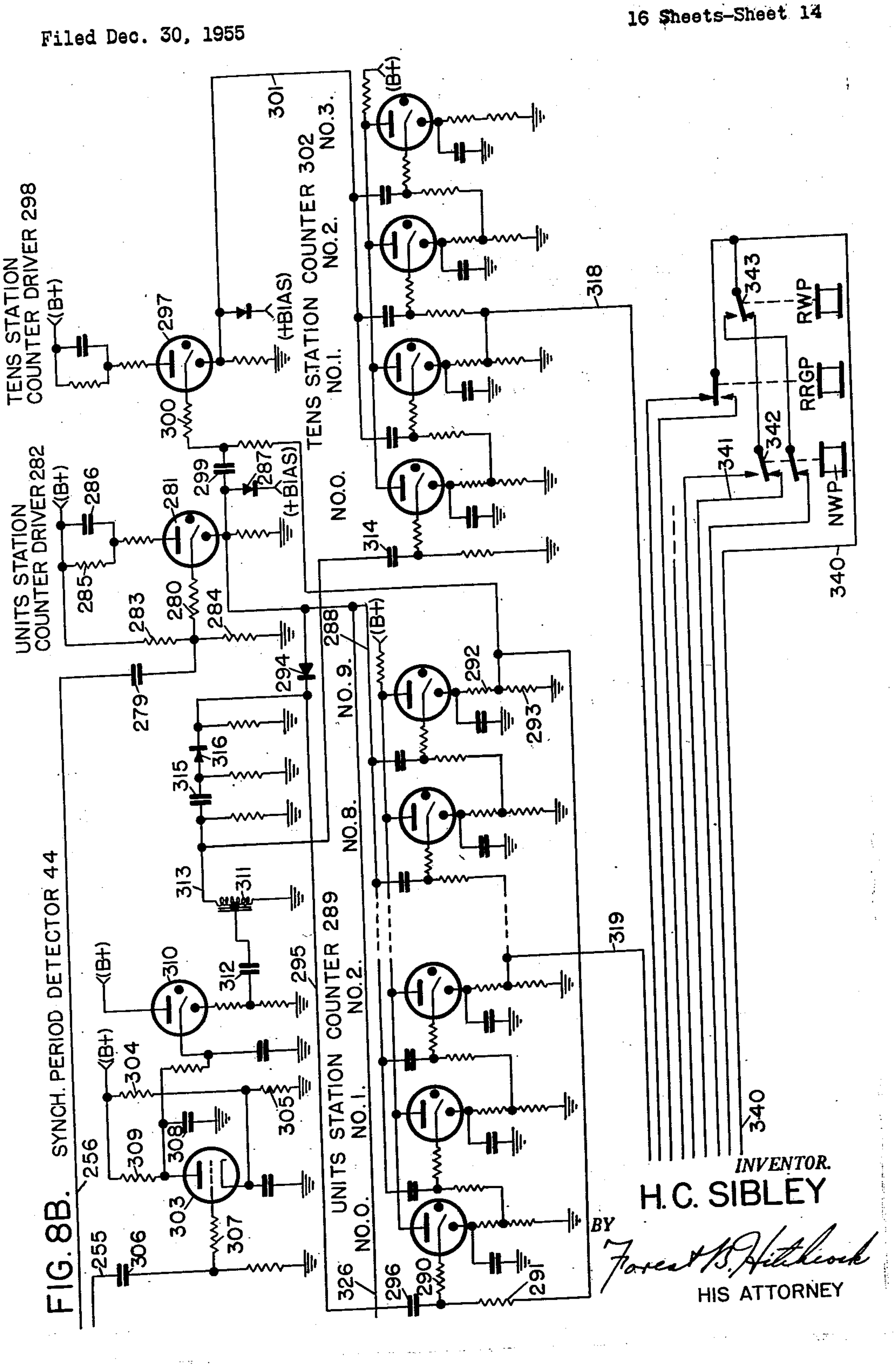
Figure 9A:
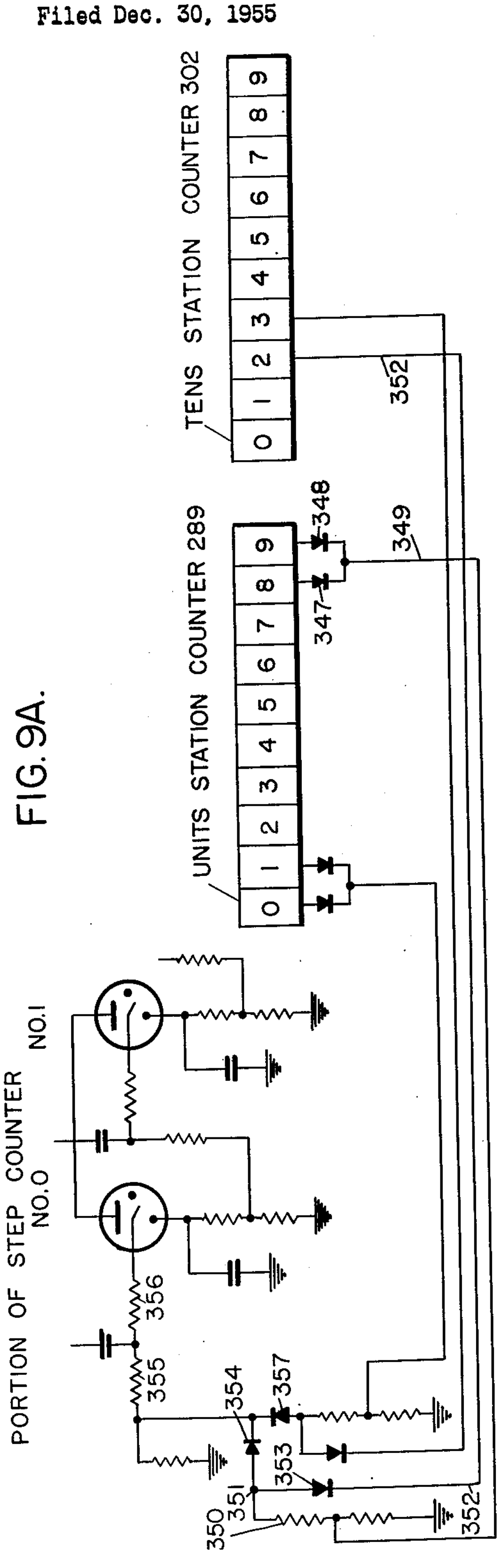
Figure 9B:
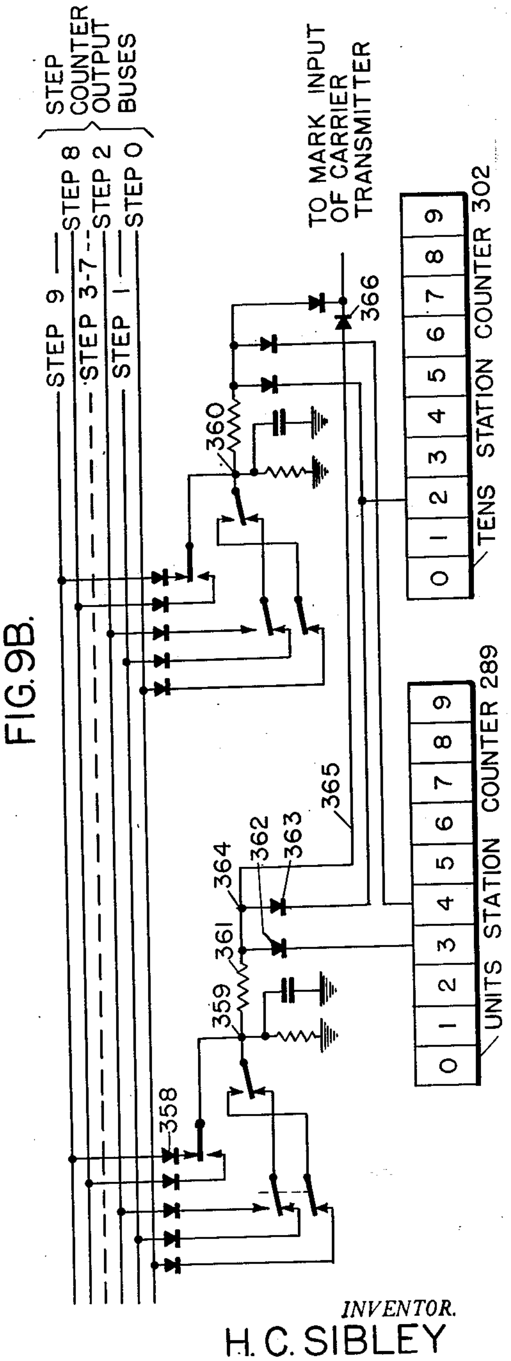
Figure 11:
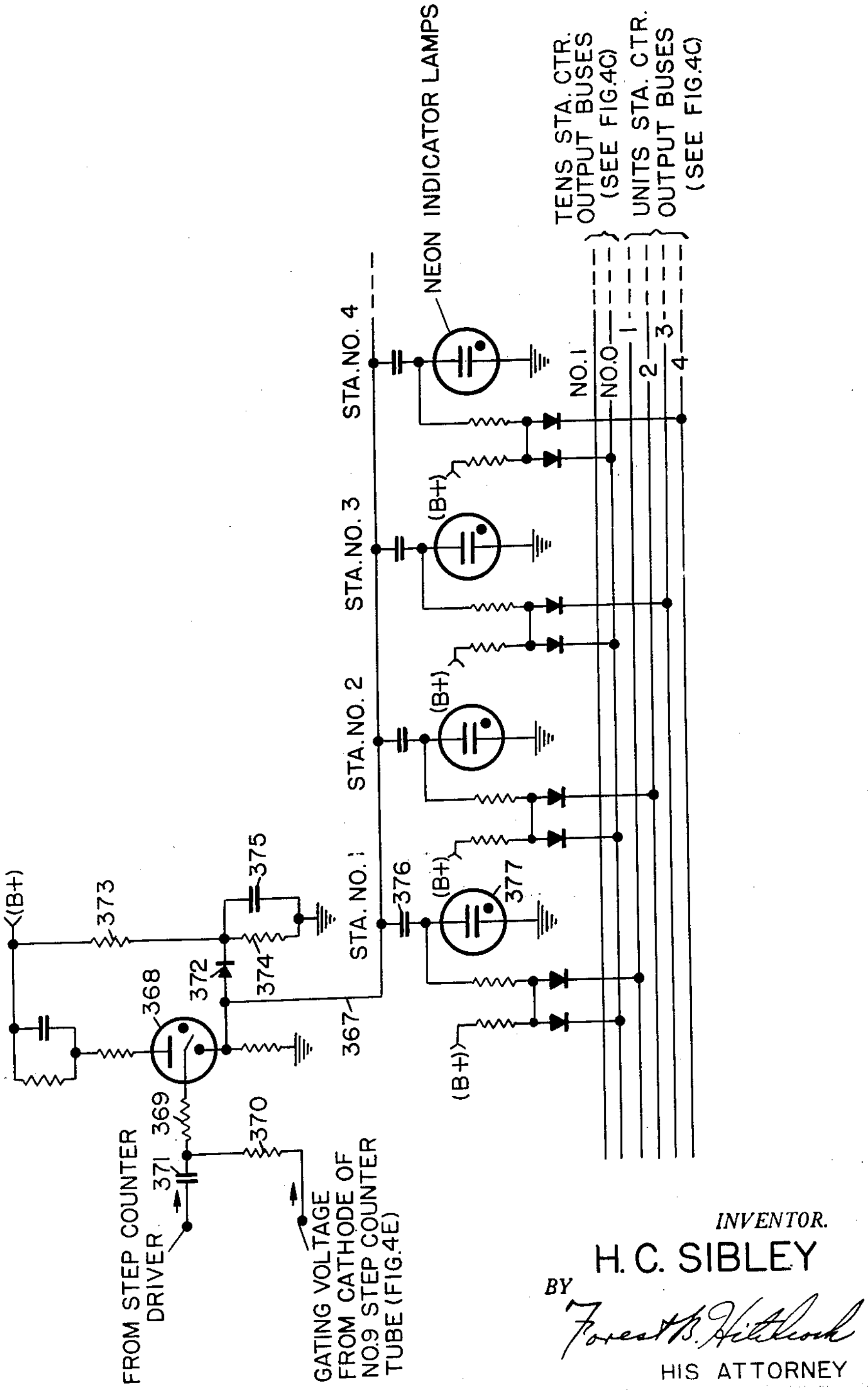

Figs. 4A–4F, when placed together in the manner shown in Fig. 5, illustrate the detailed circuit organization for the central office apparatus;

Fig. 6 illustrates waveform diagrams relating to the operation of the central office and field station apparatus;

Fig. 7 is a waveform diagram particularly illustrating the station gating delay feature of this invention;

Figs. 8A and 8B, when placed with Fig. 8B to the right of Fig. 8A, illustrate the detailed circuit organization of a typical field station;

Figs. 9A and 9B illustrate diagrammatically how various gating functions may be accomplished at a field station to cause that station to transmit indications on a plurality of successive station periods;

Figs. 10A and 10B illustrate the manner in which indication lamps and relays, respectively, may be controlled by the cold cathode tubes used in the storage units; and Fig. 11 illustrates how a plurality of indicator lamps, one for each field station, may be provided to indicate proper operation of the system.

To simplify the illustrations and to facilitate in the explanation of this invention, the various parts and circuits have been shown diagrammatically and certain conventional illustrations are employed. The drawings have been made to make it easy to understand the principles and manner of operation of this invention rather than to illustrate the specific construction and arrangement of parts that would be used in practice. The various tubes and their elements and all other circuit components have been shown in conventional form. The various relays and their contacts have also been illustrated conventionally instead of showing all of their details. Sources of electrical energy have also been represented by conventional symbols. Thus, the symbols (B+) and (B−) represent connections to the opposite terminals of a source of energy suitable for the control of electron tubes and associated apparatus. The symbol for a ground connection represents a connection to a voltage level intermediate between (B+) and (B−). The symbol (+BIAS) represents a connection to a source of direct-current power preferably positive with respect to ground by an amount less than (B+).

GENERAL ORGANIZATION

The general features of the electronic code communication system of this invention are useful in a variety of different applications where it is necessary to transmit information rapidly from a number of remote field station locations to a central office. However, to demonstrate most clearly and specifically the utility of the present invention, the particular embodiment disclosed here illustrates the use of this system as applied to the transfer of information regarding the operated conditions of switches, signals, and other devices of a section of railroad as well as track occupancy conditions to a central office where these indications may be displayed.

Figure 1:
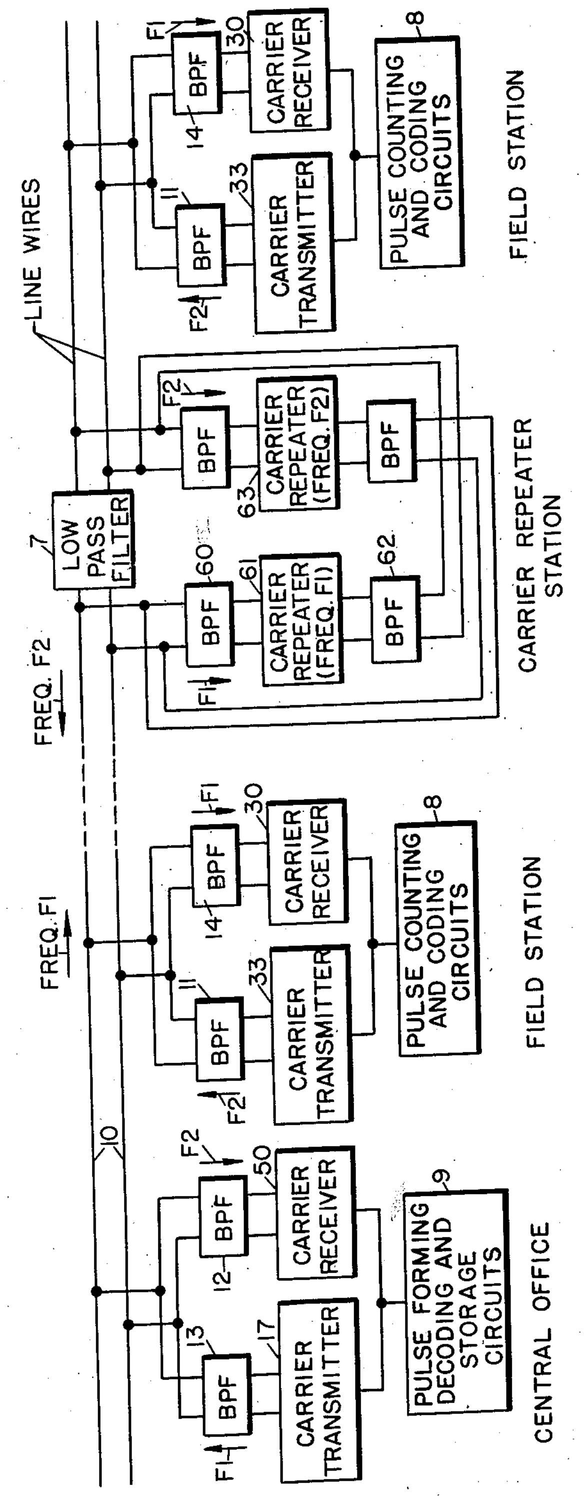
Fig. 1 is a block diagram illustrating how a central office and a plurality of field stations as well as a carrier repeater are connected to each other over the line wires.

The manner in which the central office and field stations are connected over a pair of line wires and particularly the general manner in which a carrier repeater station is used in the system is illustrated in block diagram form in Fig. 1. The carrier transmitter 17 at the central office provides a coded carrier wave signal which is applied through a band-pass filter 13 to the line wires 10. Each field station has a carrier receiver 30 which is connected to the line wires through a band-pass filter 14 similar to the filter 13 at the central office and tuned to pass only the carrier wave signal appearing on the line wires as a result of a signal obtained from carrier transmitter 17. Indication code pulses are provided at each station by a carrier transmitter 33 applying its output to line wires 10 through filter 11. The carrier receiver 50 at the central office receives coded carrier wave energy from line wires 10 through an associated band-pass filter 12. Apparatus having the general designation of pulse forming, decoding, and storage circuits 9 is associated with the carrier transmitter and carrier receiver at the central office. This apparatus causes the central office to transmit a distinctive coded carrier signal that is effective to drive all the field stations successively so that their indication codes will be transmitted at the proper time to the central office. To accomplish this, each field station is provided with apparatus designated in Fig. 1 as pulse counting and coding circuits 8 which are associated with the carrier transmitter and a carrier receiver at a field station.

To provide communication between the central office and field stations which are too remote to permit communication by means of the originally transmitted signals, a carrier repeater is provided. This apparatus is effectively connected across a low pass filter 7 connected in series with the line wires 10. This filter permits direct currents, coded or noncoded, and voice signals to pass along the line wires without interruption, whereas the carrier frequencies on the two channels provided for two-way communication between central office and remote field stations are blocked by filter 7 and must be amplified by the carrier repeaters before again being applied to the line wires. Thus, the band-pass filter 60 is tuned to pass the carrier channel F1 provided by the transmitter 17 at the central office, and this signal is amplified by the carrier repeater 61 and applied through a similar filter 62 to the line wires on the side of the low pass filter 7 that is remote from the central office. In a similar manner, another carrier repeater 63 is provided to amplify the signal on channel F2 that is put on the line wires by the carrier transmitters 33 at the remote field stations.

In this way, communication can be maintained between the central office and substantially any number of field stations. Although only one carrier repeater station is indicated in Fig. 1, additional such stations can be provided at various places along the line circuit where it is determined that additional amplification must be provided.

Figure 2A:
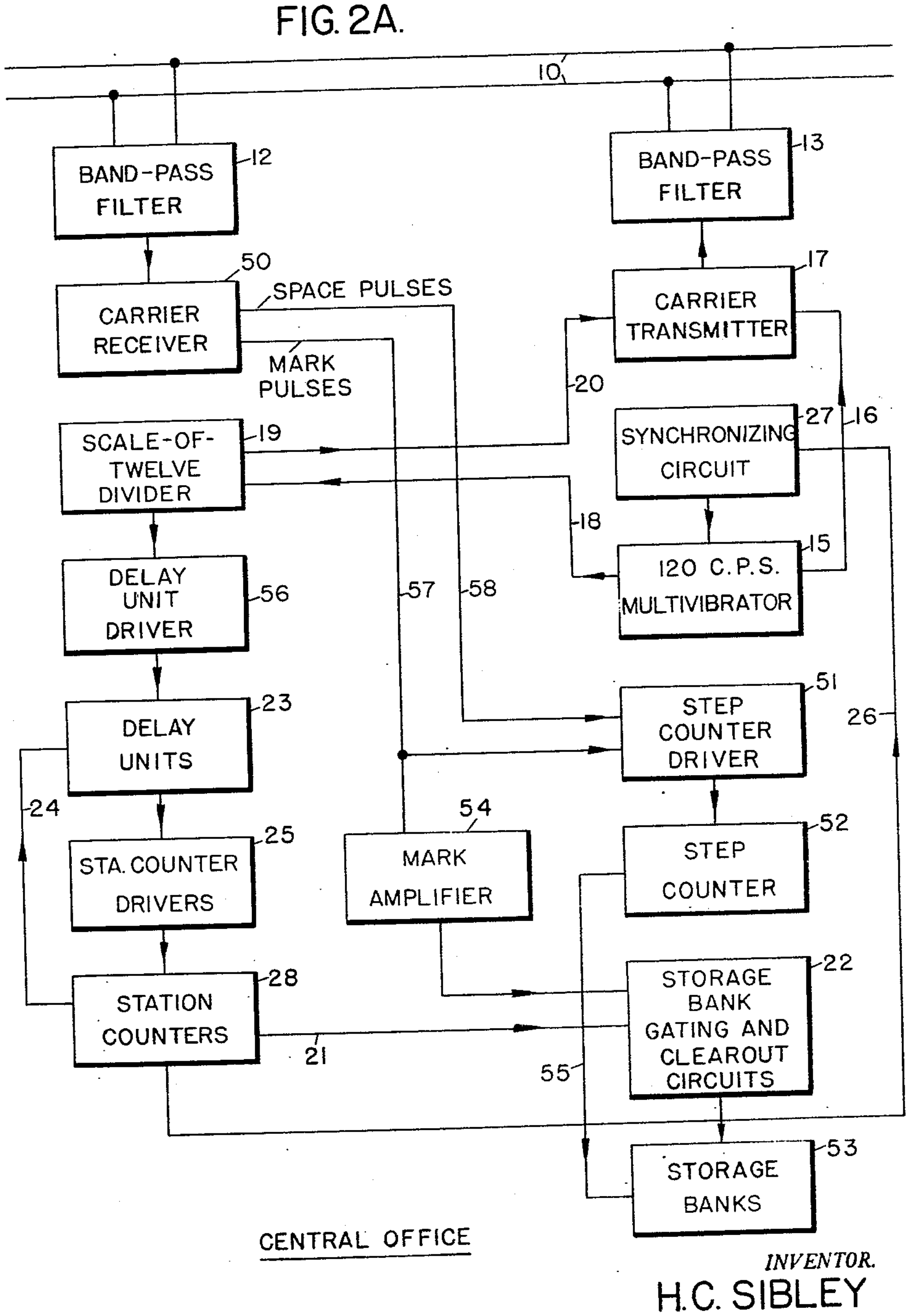
Figs. 2A and 2B are block diagrams illustrating diagrammatically the general organization of the central office and a typical field station respectively.
Figure 2B:
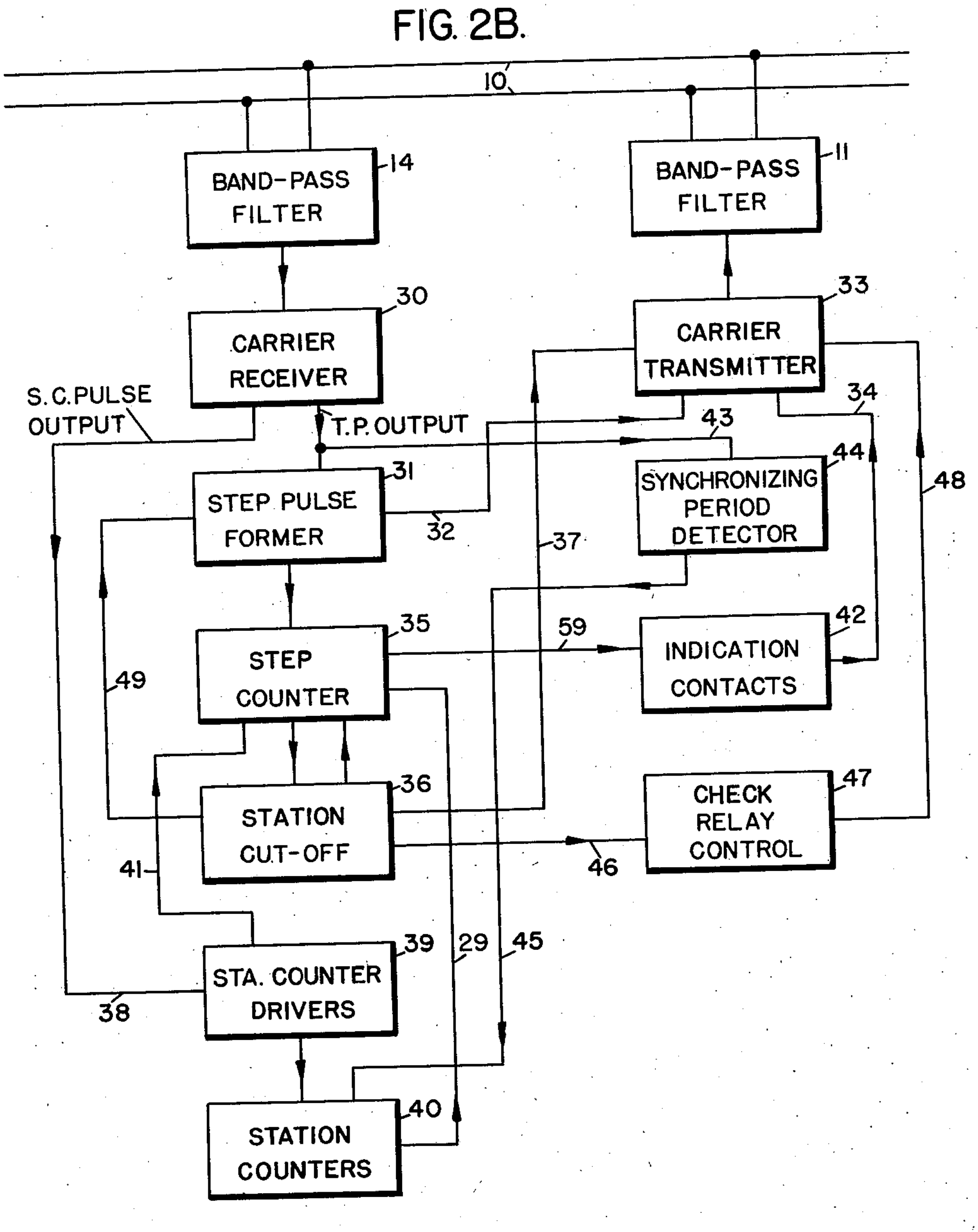

The general system organization of the present invention is shown in block diagram form in Figs. 2A and 2B without attempting to show all the various circuit organizations actually included in the detailed circuit drawings. The various connections between the blocks in Figs. 2A and 2B do not necessarily represent actual wire connections between these components but are included to show how the various major components are functionally interrelated.

All the field stations transmit their indications to the central office in succession over the line wires 10. These indications are in the form of pulses of a distinctive carrier frequency. As already described, either of two distinctive characters can be transmitted on each pulse period by a field station by selectively shifting the carrier frequency to a value that is alternatively slightly above or slightly below the nominal carrier frequency selected for that channel of communication. The resulting code characters are for convenience designated as "mark" and "space" pulses, respectively. Both these frequencies are readily passed by the band-pass filter 11 provided at each field station and also by the band-pass filter 12 provided at the central office.

The two distinctive characters transmitted from the central office to each field station are the timing pulses and the station-call pulses. These distinctive characters are similarly formed by shifting the nominal carrier frequency for central office transmission to values respectively slightly above and below the nominal frequency value. Both frequencies are readily passed by the band-pass filters 13 and 14 at the central office and field stations respectively.

The central office includes a 120 C. P. S. free-running multivibrator 15 that is effective throughout a cycle to generate the desired timing pulses at the predetermined repetition rate for the system. This multivibrator thus acts as the "clock" for the system, and its output provides a square wave of voltage having a period somewhat less than ten milliseconds. The multivibrator operates continuously throughout a cycle except during the synchronizing period which occurs at the end of each cycle and serves to synchronize the operation of all the field stations. The output of the multivibrator 15 is applied to the carrier transmitter 17 over lead 16 and is effective to key the transmitter on and off as the multivibrator output voltage alternates between its high and low lever respectively. As a result, carrier pulses, each having a duration somewhat less than five milliseconds, appear successively on the line wires 10; successive carrier pulses are separated by intervals of the same length as the carrier pulse in which no carrier is transmitted.

The output of the multivibrator 15 is also shown as being applied over lead 18 to the scale-of-twelve divider 19. This circuit organization is essentially a counting circuit. It counts the pulses received from multivibrator 15 and for every twelfth such pulse counted applies a distinctive output over lead 20 to the carrier transmitter 17. This output causes the carrier transmitter 17 to shift its frequency slightly for an interval equal to one half of a pulse period. Consequently, the code from the central office appears as shown on the upper line of Fig. 3. The code comprises a series of timing pulses but with each twelfth such pulse being shifted slightly in frequency from its nominal value to make it a distinctive station-call pulse.

Each series of timing pulses occurring between two successive station-call pulses constitutes the driving pulses for a particular field station. Each field station counts the station-call pulses transmitted from the central office and, after counting a predetermined number of such pulses, a gating circuit becomes effective which permits the field station to respond to the timing pulses received from that time until the occurrence of the next station-call pulse. Each station thus answers back to the central office only in response to the timing pulses intended for that station. At the central office are a plurality of storage units, one bank of such units being provided for each station period. These storage banks must be successively gated in turn so that the received indication pulses from any field station will only be effective upon the bank of storage devices provided for that particular field station.

To demarcate these different station periods and thus provide the required gating function on the storage banks, station counters 28 are provided. As will be shown, the station counters 28 comprise two step-by-step counting chains, one for counting units and the other for counting tens. Each time the units counter has counted its capacity of ten counts, it is restored to its zero condition and an input pulse is simultaneously applied to the tens counter to advance its count by one. Thus, these two decade counters together assume a different permutation for each station-call pulse and thereby are effective, as will be described, to gate on each station period a different storage bank. This is accomplished by providing a control from the station counter 28 over lead 21 to the storage bank gating and clear out circuits 22.

As previously described, it is desirable that the station gates provided by the station counters 28 be made to have variable phase relationships with respect to the group of driving pulses transmitted to the various field stations in order that varying amounts of delay time involved in transmitting to the respective field stations may be accommodated. This is accomplished by providing a plurality of delay units 23. These delay units 23 are shown in Fig. 2A as being subject to a gating control from the station counters 28 over lead 24. This makes it possible to make the various delay units successively effective in a cycle of operation and at preselected times in the cycle as determined by the station counters 28. Each delay unit 23 when thus rendered active is effective through the station counter drivers 25 to cause an advance of a step in the station counters 28 on some particular predetermined step of the scale-of-twelve divider 19.

More specifically, to provide additional delay in the station gating for more remote field stations at any time in the cycle it is only necessary to cause the station counters 28 to condition an additional delay unit. This delay unit is effective to advance the station counters 28 by one count only on a particular preselected output step of the scale-of-twelve divider 19 through a controlling input obtained from the delay unit driver 56. This preselected step may coincide with, or follow by any desired number of pulse periods, the particular step that produces the distinctive station-call pulse. In this way, it is possible for the indication pulses from remote field stations to fall within their respective station gate at the central office even though such returning pulses may be considerably delayed because of their having been repeated several times through carrier repeaters.

At the end of a cycle, the station counters 28 are effective over lead 26 to operate the synchronizing circuit 27. When this occurs, the synchronizing circuit 27 stops the operation of the multivibrator 15 for a short time which, in one embodiment of this invention, was made substantially equal to one station period. With the master timing means of the system made temporarily inoperative in this way, pulses cannot be transmitted from the central office. This forms the desired period of "silence" which is used to synchronize the system.

The timing pulses and station-call pulses received at each field station are passed by the band-pass filter 14 to the carrier receiver 30. This receiver 30 is adapted to provide separate outputs for each timing pulse and station-call pulse.

The timing pulse outputs are applied to the step pulse former 31 which reshapes the pulses and supplies its output over lead 32 to the carrier transmitter 33. These successive square wave pulses cause the carrier transmitter to be keyed off and on. As long as no input pulse appears simultaneously on lead 34 with the gating pulse on lead 32, the carrier transmitter 33 transmits a "space" pulse to the central office. If, however, an input does appear on lead 34 concurrently with the output pulse from the step pulse former 31, the transmitter is then effective to transmit a "mark" pulse through band-pass filter 11 to line wires 10.

The step pulse former 31 also produces trigger pulses which are effective to cause a step-by-step progression of the step counter 35. This operation of the step counter demarcates the various pulse periods of the station period for that station. Since this step counter has a counting capacity of only ten counts, it can respond only to the first ten timing pulses following the particular station-call pulse that made this station responsive. This use of only the first ten pulse periods out of the total of twelve occurring from one station-call to the next makes it possible to accommodate a rather considerable loop delay in the system by permitting the indication code from any station to be delayed quite considerably and yet be received within the station gate for that station at the central office even if no extra delay time is provided by the use of delay units as described briefly above.

When the step counter 35 has counted its capacity of ten counts, the next pulse from the step pulse former 31 produces operation of the station cutoff 36. This action not only clears out the step counter 35 but also provides a control over lead 37 to the carrier transmitter 33 which renders the transmitter 33 inoperative.

The station-call pulse output of carrier receiver 30 is applied over lead 38 on the station counter drivers 39. For each station-call pulse, an input pulse is applied to the station counters 40 thereby causing a step-by-step progression of these counters. The station counters 40 are similar to those provided at the central office and include two interconnected counters, one for counting units and the other for counting tens. The station counters are thus capable of recording by the particular permutations of their conditions the progress of each cycle of operation.

A gating connection is provided from the station counters 40 over lead 29 to the step counter 35. This gating permits the normally inactive step counter 35 to respond to the particular station-call pulse that signals the beginning of the station period on which that station is to transmit an indication code. This station-call pulse is obtained from the station counter drivers 39 and applied over lead 41 to the step counter 35 to put it into operation. When this happens, the station cutoff 36 is made ineffective so that the disabling gates that have been effective on carrier transmitter 33 are immediately removed. At the same time, a disabling gate on the step pulse former 31 represented by lead 49 is removed so that this circuit can then respond to the timing pulses obtained from receiver 30 and thus apply trigger pulses that will drive the step counter 35.

Each step of the step counter 35 has associated with it an output bus, and these buses, designated by lead 59 are selectively energized in turn. Dependent upon the conditions of the indication contacts 42, lead 34 becomes selectively energized on successive pulse periods. Whenever the conditions of the indication contacts are such as to permit lead 34 to be energized on a particular pulse period demarcated by step counter 35, a "mark" output pulse of the carrier transmitter 33 results; on all other pulse periods, a "space" output character is produced.

The timing pulse output of carrier receiver 30 is also applied over a lead 43 to the synchronizing period detector 44. The synch period detector is essentially a two-state device which is maintained continually in one of its two states whenever the timing pulses are received continuously at the preselected rate but is restored to its other state when these pulses are not received during the synchronizing period. When the synch period detector 44 has thus determined the existence of the synch period in the cycle, it provides resetting pulses over lead 45 to the station counters 40 to cause both decade counters to be restored to their zero conditions. This ensures that all the station counters at the various field stations are properly restored at the beginning of each cycle of operation.

The station cutoff 36 is continuously effective, except during the time when the station is actually transmitting its indication, to provide a controlling voltage over lead 46 to the check relay control 47. The station cutoff 36 is effective to provide this controlling voltage only in the event that certain conditions are met so that energization of the check relay provides an indication of proper operation of most of the apparatus provided at a field station. In the event that the check relay becomes deenergized, a control becomes effective over lead 48 to render the carrier transmitter 33 inoperative. This action prevents the carrier transmitter 33 from continually supplying carrier to the line wires 10 and thereby making it impossible for intelligence to be transmitted to the central office on this carrier channel from the other field stations.

Figure 3:
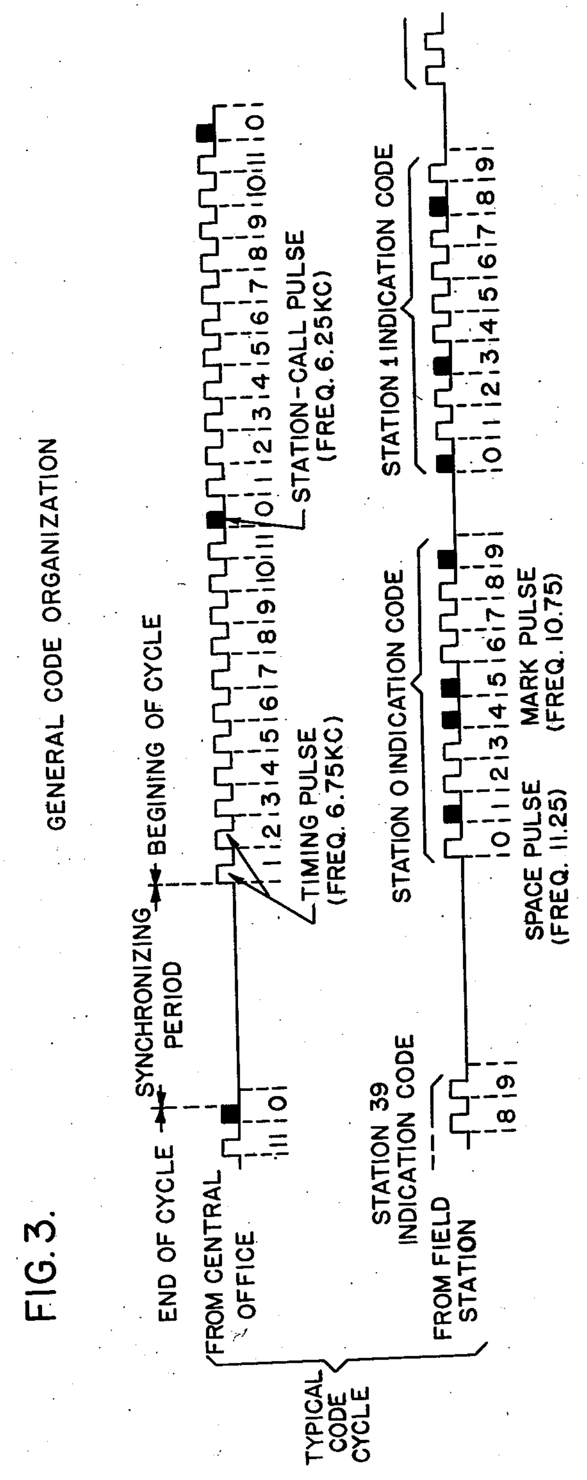
Fig. 3 is a simplified timing chart showing the general code organization of the system.

A typical indication code such as may be received at the central office is diagrammatically illustrated in the lower line of Fig. 3. The pulses of carrier frequency are applied through band-pass filter 12 to the carrier receiver 50 which is similar to the receiver 30 provided at each field station. Separate outputs from the receiver on leads 57 and 58 supply pulses corresponding to the occurrences of "marks" and "spaces," respectively, in the indication code. The "mark" and "space" outputs are in effect combined by the step counter driver 51 which provides the required triggers effective to produce a step-by-step progression of the step counter 52.

The storage banks 53 provide an individual bank of storage devices for each station period in the cycle. Associated with each bank is a corresponding storage bank gating and clear out circuit 22, and these are selectively gated throughout a cycle by the station counter 28. Consequently, the mark pulses obtained from the carrier receiver 50 which are amplified by the mark amplifier 54 are in this way routed to the proper bank of storage devices. The individual storage units in each bank are selectively gated on the various steps of the received indication code by the step counter 52 whose control is designated by lead 55 in Fig. 2A. On each pulse period in the code from a particular station, a particular storage device in the bank for that station is gated by the step counter. That particular storage device can be energized only if a mark pulse is received on that step. If a space pulse is received, the device is not energized.

The storage bank gating and clear out circuits 22 associated with the storage banks 53 are also effective just prior to routing a new indication code to a bank of storage units to clear out all previously received indications from such bank. Thus, the storage devices in any bank can be selectively energized again in accordance with the marks received in the indication code. In this way, the received indications are stored at the central office in storage units which may be effective to provide a visual display of indications or may be effective to energize electromagnetic relays for any purpose.

*Central office pulse generating circuits*

In describing the detailed circuits of this invention, reference will be made to Figs. 4A–4F which showed the detailed circuits of one embodiment of the invention and to Fig. 6 which illustrates various voltage waveforms appearing in the system. Reference will also be made to Figs. 8A and 8B which illustrate the circuit organization at a typical field station of the system. Fig. 7 will also be referred to as this drawing shows the time relationships involved in providing the variable station gating delay at the central office.

With respect to the waveform diagrams shown in these drawings, the various voltage waveforms have been illustrated to facilitate an understanding of the operation of the system rather than to show the exact form of the voltage variation in each case. For example, various gating voltages are shown as being rectangular in shape with vertical leading and trailing edges. In actual practice, these voltages necessarily have sloping leading and trailing edes, but this has been shown only where required to obtain a more accurate picture of the operation of the system.

The basic repetition rate of the system is established at the central office by the 120 C. P. S. multivibrator 15 shown in Fig. 4A. This is a free-running multivibrator comprising the two triode tubes 68 and 69 which are interconnected in such a way that they successively alternate between conductive and nonconductive conditions at a rate of 120 times per second. Multivibrators of this kind are well-known in the art so that it is deemed unnecessary to describe in detail the circuit organization and manner of operation of this multivibrator. It is believed necessary to mention only that one or the other of the two tubes 68 and 69 is always conductive and while in this condition is effective to maintain the other tube nonconductive. This condition abruptly reverses itself after a predetermined interval to cause the nonconductive tube to become conductive and vice versa. This operation occurs at the 120 C. P. S. rate which means that each tube remains conductive somewhat less than five milliseconds and then becomes nonconductive for the same length of time before again being restored to its conductive condition.

When either tube 68 or 69 is conductive, the flow of plate current through its plate load resistor causes its voltage to be reduced to a fairly low value. However, when such tube is nonconductive, there is then no plate current flowing through its plate load resistor and its voltage rises substantially to the level of the (B+) voltage source. Consequently, the voltage appearing at the plate of tube 69 has approximately the waveform shown at line A of Fig. 6.

The multivibrator just described is symmetrical with respect to its opposite halves with the exception that the cathode of tube 68 is connected to the plate of tube 70 rather than directly to ground as is the cathode of tube 69. Throughout a cycle of operation, tube 70 is conductive as will subsequently be described and thereby provides a very low resistance path from its plate to its grounded cathode. In effect, therefore, there is only negligible dissymmetry between the two halves of the multivibrator as long as tube 70 is in a conductive condition.

The output voltage of this multivibrator appearing at the plate of tube 69 is applied directly to the carrier transmitter 17 over wire 71 and keys the transmitter on and off alternately as the waveform varies between its upper and lower voltage values. This causes the carrier wave signal to appear intermittently on the line wires 10 in accordance with the rate directly established by the multivibrator 15. This transmitter 17 is provided with another input control over wire 72. When a positive voltage appears on this latter wire 72 concurrently with the high level of voltage on wire 71, the frequency of the carrier transmitter is shifted to its lower value so that a distinctive station-call pulse is transmitted. However, in the absence of such voltage on wire 72, the carrier transmitter 17 transmits on its higher shift frequency so that a timing pulse is transmitted as illustrated diagrammatically in Fig. 6 at line F.

The output pulses at the plate of tube 69 are also applied through a coupling capacitor 73 and resistor 74 to the control grid of tube 75 included in the pulse former 76. This circuit organization is essentially a differentiating circuit which is effective to provide positive-going trigger pulses of a preselected width for each abrupt negative-going voltage variation applied to its input circuit. The pulse forming circuit comprises tube 75 having its control grid connected through series resistors 74 and 77 to (B+). As a result of this connection, tube 75 is normally in a fully conductive condition. Its control grid is, however, at substantially the same voltage as the grounded cathode because the flow of grid current through the high resistance of resistors 74 and 77 so reduces the grid voltage that the grid is only very slightly positive with respect to the cathode.

Each positive-going voltage variation applied through the differentiating capacitor 73 and resistor 74 to the grid of tube 75 whenever there is a rise in voltage at the plate of tube 69 merely tends to produce an increase of grid current without producing any effective increase of grid-cathode voltage across the low resistance circuit existing between grid and cathode of tube 75. However, when a negative-going voltage variation appears at the plate of tube 69, capacitor 73 discharges and produces a negative-going voltage variation at the grid of tube 75 that causes this tube to become fully cut off. As a result of this action, the plate voltage of this tube, which is normally at a low value because of the flow of plate current through resistor 78, rises abruptly to a high value substantially equal to that of the (B+) source. The duration of this condition is dependent on the time required for capacitor 74 to discharge. As capacitor 74 discharges, the grid voltage rises exponentially, and as the grid-cathode voltage passes through the cutoff point, tube 75 again becomes conductive and its plate voltage is then reduced to its normal low value. In this way, each negative-going voltage variation at the plate of tube 69 is effective to produce a positive-going voltage pulse at the plate of tube 75. The time constant for the discharging of capacitor 73 is selected to provide the desired width of pulse at the plate of tube 75.

Pulse forming circuits of this kind are used at various places in the circuit organization of this invention. Having described in detail here the manner of operation of one such pulse forming circuit, it is believed unnecessary to again describe it in detail when future reference is made to a circuit of this kind.

With particular reference to the pulse former 76 of Fig. 4A, the time constant selected for the discharge of capacitor 73 is preferably selected so that the positive-going trigger pulses at the plate of tube 75 will have a width that is approximately one half the width of the output pulse of the multivibrator 15. As a result, these trigger pulses provided by the pulse former 76 appear substantially as shown at line B of Fig. 6.

These pulses are applied through a coupling capacitor 79 and a resistor 80 to a guide electrode of tube 81 which is a twelve-cathode, cold-cathode glow tube included in the scale-of-twelve divider 19. The general structural organization of the multicathode tube 81 and also its general manner of operation are described in an article appearing in the November 1953 issue of the magazine "Electronics." This article, entitled, "Poly-cathode Counter Tube Applications" describes in detail the manner in which the glow between the plate and any cathode is transferred from cathode to cathode in response to the application of input pulses to the tube.

The input pulses on wire 82 appear with substantially no delay on the guide electrode 84. Each time the output voltage of tube 75 in the pulse former 76 drops in value on the negative-going trailing edge of its output pulse, a negative-going voltage pulse appears immediately at the junction of resistors 80 and 83. The duration of this pulse is dependent upon the time required for capacitor 79 to discharge. The discharging of this capacitor 79 cannot at the same time produce an immediate voltage decrease at the other guide electrode 85 because of the effect of capacitor 86 which must first charge negatively at an exponential rate before the voltage at the guide electrode 85 can be decreased below ground level. There is thus a slight time delay in the appearance of negative-going pulses at the guide electrodes 84 and 85, and this delay is required to produce a transfer of the glow from one cathode to the next in the manner described in the reference article mentioned above. In response to these negative-going pulses occurring on the guide electrodes of tube 81, the glow may be transferred from any cathode to an adjacent cathode.

Each positive-going voltage pulse provided by the pulse former 76 produces positive-going pulses at the guide electrodes 84 and 85, but these are not effective to cause the transfer of the glow from one cathode to another. The cathodes are all arranged in a circular pattern about the anode of the tube so that the cathode appearing at one end is actually adjacent the cathode at the opposite end. Consequently, as pulses are applied successively to the guide electrodes of this tube, the anode-cathode glow continuously transfers from one cathode to the next in a repeating circular pattern.

When the glow is on a particular cathode of tube 81, there is a flow of current from the plate of the tube to that particular cathode. This produces a voltage drop across the associated cathode resistor to provide a positive-going voltage variation which persists until the glow is transferred by a subsequent pulse to an adjacent cathode. Where several successive cathodes are provided with a common cathode resistor, the cathode voltage across such common resistor, of course, remains elevated throughout the time that the glow is on any of the associated cathodes.

Line C of Fig. 6 illustrates diagrammatically the cyclical operation of tube 81. This waveform does not attempt to show the voltages developed across the various cathode resistors, but merely illustrates the manner in which the glow shifts from cathode to cathode throughout a cycle, being stopped only in the synchronizing period.

*Delayed station gating—delay units*

As previously explained, station gating at the central office has as its object the routing of received indication codes to the proper storage units. The respective station gates are actually formed from the outputs of two station counters. One of these counters is a units counter, and the other a tens counter. Together these two counters at any time represent by their combined conditions the progress of a cycle of operation so that they are able to provide, for example, an enabling gate to the bank of storage devices provided for station 23 during the period of time that indications from this particular field station are being received at the central office. In this way, the received indications can become stored only in this particular storage bank and not in any of the others.

It has been deemed preferable in the present invention to transmit either of two distinctive code characters on each pulse period when transmitting from any field station to the central office. A closed condition of certain contacts results in the transmission of one kind of character on a particular step of the code and an open condition causes the other kind of character to be transmitted. No special type of character is transmitted for station identification purposes, and for this reason, it is believed preferable to operate the station counter at the central office in accordance with the timing pulses and station-call pulses transmitted to the various field stations rather than in response to the indication code received from the field stations.

To accommodate considerable delay times in the receiving of indication codes from field stations, it is necessary that the driving input to the two station counters be capable of being delayed in time with resect to the transmitted station-call pulses. It is, furthermore, desirable that additional increments of delay time be capable of being added as desired in the cycle so that the station gates for the more remote field stations will be longer delayed with respect to the station-call pulses than those provided for the nearest field stations. To accomplish this, a plurality of delay units are provided, and each has associated with it a particular amount of delay time which is an integral number of pulse periods as demarcated by the scale-of-twelve divider 19. The station counters condition these delay units in succession throughout a cycle of operation on certain preselected station periods. Normally, at the beginning of a cycle, the delay unit No. 1 is conditioned by having its cold cathode tube 90 fired. Whenever this delay unit is thus conditioned, a triggering pulse to the station counters is provided each time that the glow on tube 81 advances from cathode zero to cathode one. As will be seen, this provides the minimum delay time in that the station gate for the station then to be transmitted to extends from a time following directly after the station-call pulse for that station until directly after the next station-call pulse.

At some time later in the cycle when it is determined that additional delay time must be provided for the station then to be transmitted to extends from a time following directly after the station-call pulse for that station until directly after the next station-call pulse.

At some time later in the cycle when it is determined that additional delay time must be provided for the station gating, the delay unit No. 2 is conditioned by firing its gas tube 91. The firing of this gas tube 91 not only brings this particular delay unit into effect but also extinguishes the cold cathode tube 90 of delay unit No. 1 to make that delay unit inoperative. Throughout the portion of the cycle that the delay unit No. 2 is effective, triggering pulses for driving the station counters so as to generate the station gates occur now one pulse period later, i. e. each time that the glow of tube 81 transfers from cathode 1 to cathode 2. In a similar way, additional delay units may be provided as required, and brought into effect at preselected times in the cycle as determined by the condition of the station counters. Each additional delay unit may thus be effective to generate operating pulses for the station counters that are delayed by an additional pulse period. In other words, for each additional delay unit provided, the station counters may be made to advance their count one step later in the cyclical operation of the polycathode tube 81.

The trigger pulses that are effective to fire the cold cathode tubes in the various delay units such as tubes 90 and 91 are provided by the delay unit driver 56. This driver 56 comprises a triode amplifier tube 92 having its grid connected through resistor 93 to cathode No. 10 of tube 81. The cathode of this tube 92 is positively biased by being connected to the junction of voltage dividing resistors 94 and 95 connected between (B+) and ground. The capacitor 96 connected from the cathode to ground acts to maintain the cathode voltage at its preselected level.

Whenever the glow in tube 81 reaches cathode No. 10, there is an increase of voltage across cathode resistor 97 so that the control grid of tube 92 becomes more positive. The plate voltage of this tube which is normally at a relatively high value because of the normal nonconductive condition of this tube is suddenly reduced in value as this tube now becomes conductive, but is quickly restored to its normal high value as the cathode glow of tube 81 advances to cathode 11. Thus, the positive-going voltage pulse at the cathode 10 of tube 81 appears effectively also at the plate of tube 92 with the exception that it is now inverted. This negative-going square wave pulse is then applied to a differentiating circuit comprising capacitor 98 and resistor 99 connected in series between the plate of tube 92 and ground. The negative-going leading edge of this pulse tends to produce a negative trigger pulse at junction point 100 but this is prevented from appearing by the clamping diode 101 which becomes conductive whenever the voltage at this junction point tends to go below ground. The positive-going trigger pulse occurring upon the trailing edge of the plate pulse of tube 92 causes the diode 101 to become nonconductive with the result that this positive trigger pulse can then appear on bus 102.

A connection is provided from bus 102 through clamping diode 103 to the terminal designated (+BIAS). This represents a source of direct-current which in one embodiment of this invention was selected to be approximately 60 volts. This connection through diode 103 has the function of preventing the positive-going trigger pulse from exceeding a peak value of 60 volts above ground. This limiting of the pulse amplitude is necessary since, if the pulse were of much larger amplitude, it might readily fire a cold cathode tube such as tube 90 even though the starters of this tube were not positively biased. This would result in improper operation since the tube should only be fired when it is properly gated by having the positive bias on its starter.

It may be said in summary then that a positive-going trigger pulse appears on bus 102 each time that the voltage on cathode 10 of tube 81 is abruptly reduced in value, i. e., whenever the glow transfers from cathode No. 10 to cathode No. 11. One such trigger pulse is, therefore, provided on each twelfth pulse period but, as will soon be made clear, one of these trigger pulses can be effective to fire a cold cathode tube in a respective one of the delay units only if the tube is at that time properly gated by both the units and the tens station counters.

Ordinarily, the minimum delay time is required at the beginning of the cycle when communication is being had with the nearest field station. Therefore, at the beginning of the cycle it is necessary that the delay unit No. 1 be put into operation by a pulse from the delay unit driver. Accordingly, an "and" gating is provided from the starter of cold cathode tube 90 in the delay unit No. 1 to the No. 0 stages of both the units station counter 104 and the tens station counter 105. More specifically, a connection is provided from (B+) through resistor 106, to the junction 107 of two diodes 108 and 109. If the cold cathode tube of the No. 0 stage of the units station counter 104 is not fired at this time, the voltage at the junction of its cathode resistors 110 and 111 will be at ground level. Therefore, the voltage at the junction point 107 will then be determined by the relative values of resistors 106 and 111 and, since resistor 106 is chosen to be of a relatively large value of resistance, this will cause the voltage at junction point 107 to be at substantially ground potential. The same condition holds true with respect to the cathode of the tube in the No. 0 statge of the tens station counter 105. If this tube is nonconductive, it will similarly prevent the voltage at junction point 107 from raising appreciably above ground. Both tubes of the No. 0 stages of the two station counters must, therefore, be conductive in order for a positive gating voltage to appear at the junction point 107 and thus be effective through resistor 112 and rectifier 113 on the starter of the cold cathode tube 90. This assures that it is only at the beginning of a cycle of operation when the station counters have both been restored to their zero conditions that the cold cathode tube 90 of delay unit No. 1 can become properly gated so that it will fire in response to a positive-going trigger pulse that it also receives through capacitor 114 from the delay unit driver 56.

Figure 4B:
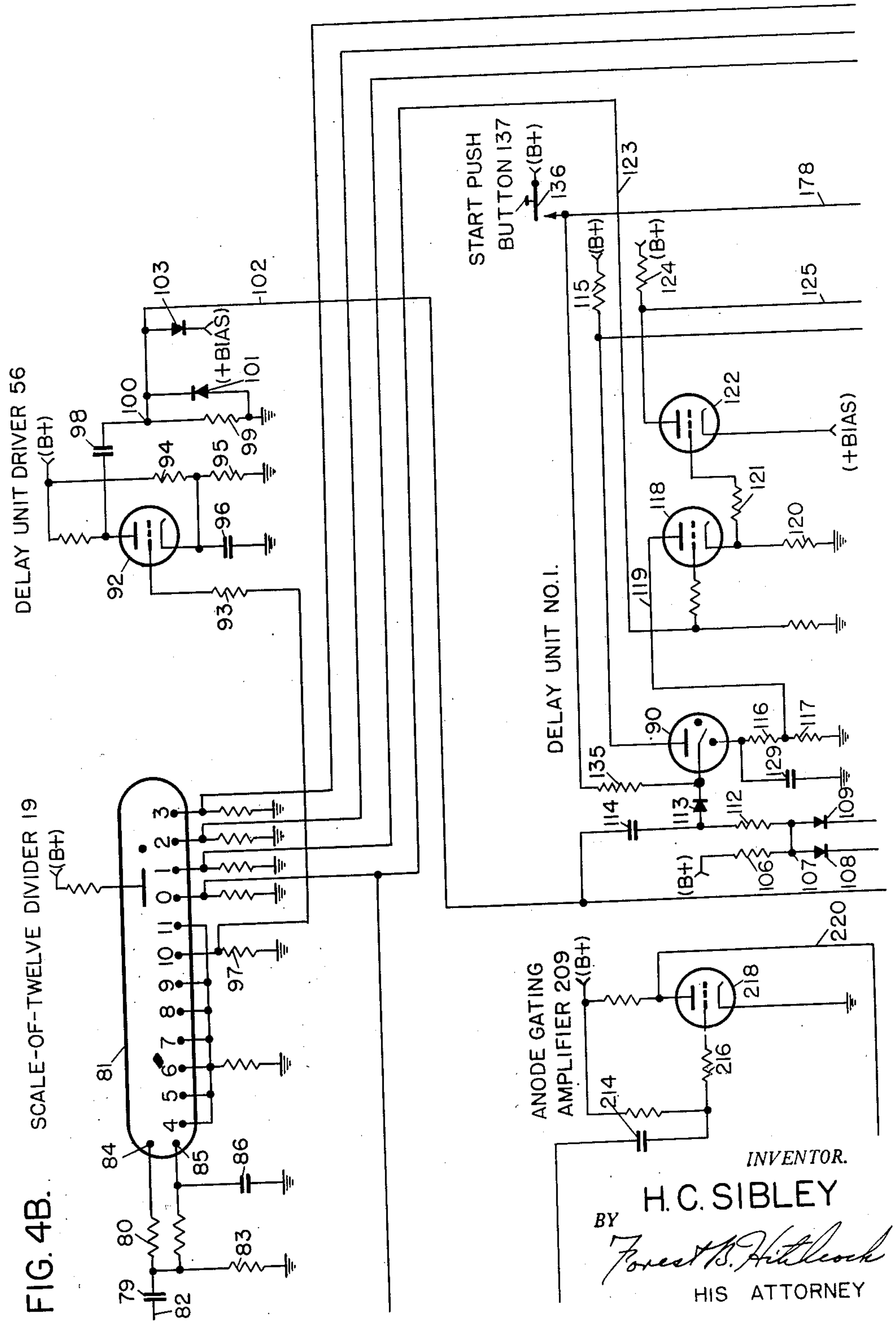
Figure 4C:
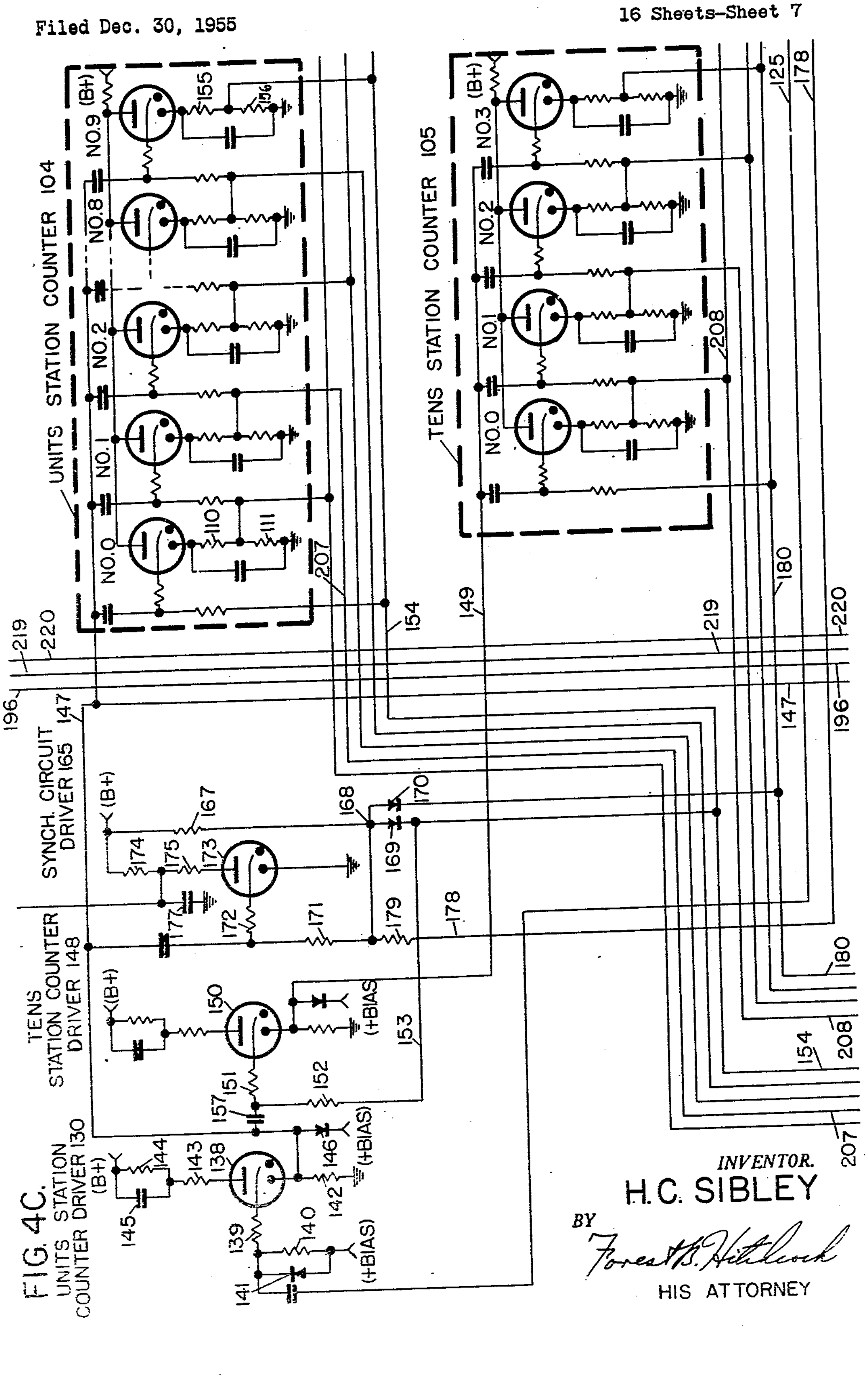
Figure 4D:
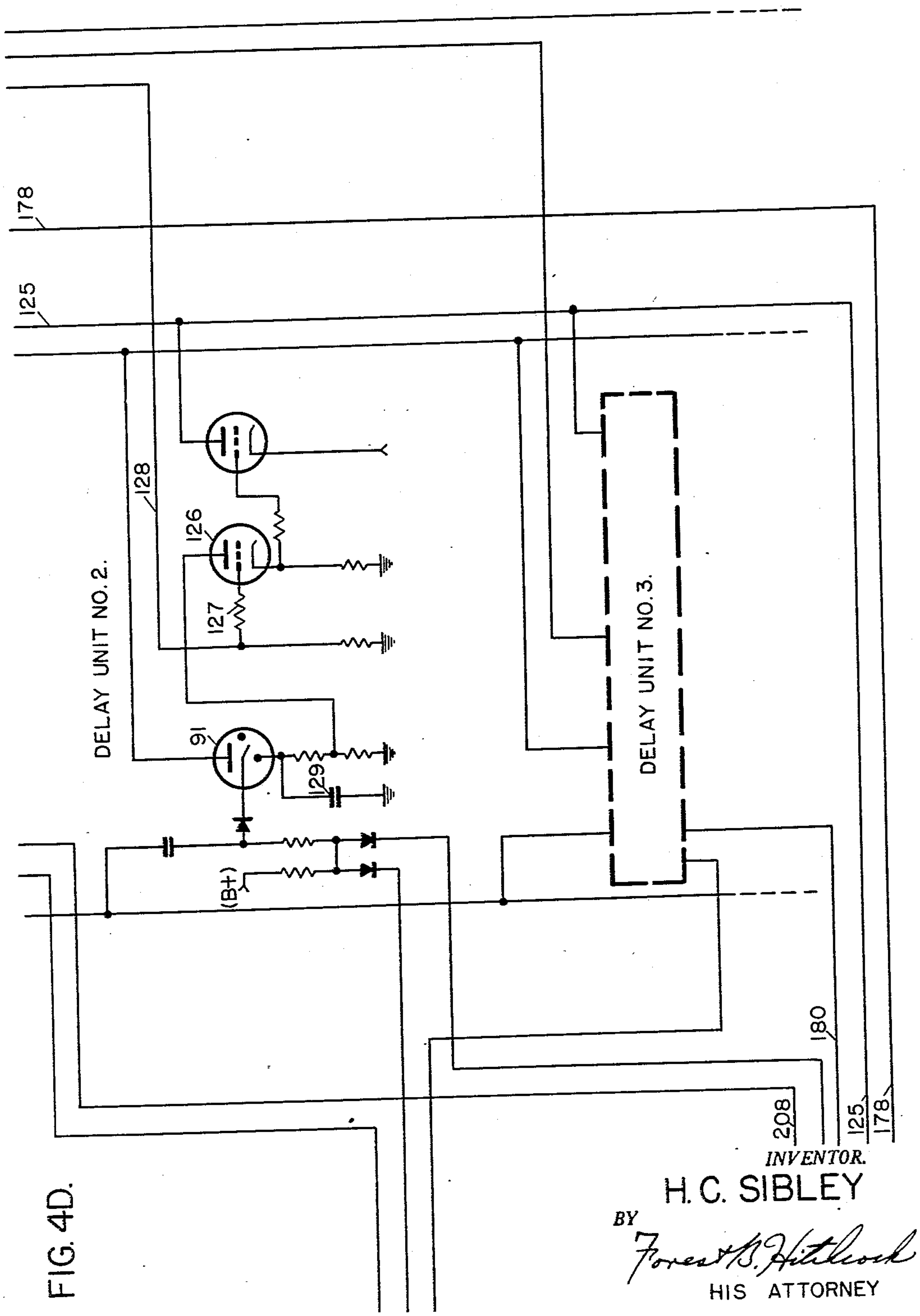

As will be clear from the drawings, corresponding "and" gating circuits are established for the cold cathode tubes of the additional delay units shown in Fig. 4D. For example, delay unit No. 2 is shown as being provided with an "and" gating circuit from stage No. 2 of the tens station counter 105 and stage No. 2 of the units station counter 104. Consequently, cold cathode tube 91 of this delay unit No. 2 is not fired until the twenty-second station period during which time communication is being had with field station No. 22. Of course, tube 91 is actually not fired until nearly the end of this twenty-second station period since it does not receive a trigger pulse from the delay unit driver 56 until the glow on tube 81 transfers from cathode No. 10 to cathode No. 11. The extra delay increment does not actually become effective, therefore, until the following station period.

All the cold cathode tubes in the various delay units are provided with a common plate resistor 115 shown in Fig. 4B. As a result of this common plate resistance, the firing of any one of these tubes results in the extinguishing of any other tube that has been fired. This occurs as a result of the increased voltage drop across the resistor 115 occurring momentarily upon the firing of an additional tube which causes the plate voltage for all the tubes to be decreased. All of these tubes are provided with a capacitor 129 connected from their cathode to ground, and this capacitor quickly becomes charged to the cathode voltage after the tube has fired. When there is a momentary reduction in plate voltage as a result of the firing of a second tube, the cathode voltage of the already fired tube cannot be instantly reduced so that its plate-cathode voltage momentarily goes below that required to maintain the tube conductive so that it is extinguished. This does not occur with the just fired tube, however, because its cathode capacitor has not yet had time to become fully charged; such tube remains in its fired state. The common plate resistance for these tubes, therefore, provides that only one will be conductive at any one time.

Throughout the time that cold cathode tube 90 in delay unit No. 1 is fired, there is a positive voltage at the junction of its cathode resistors 116 and 117 which provides plate-cathode voltage for the triode tube 118. This tube is operated as a cathode follower and conducts only a slight amount of plate current because of its grounded cathode even when it is provided with plate voltage over wire 119. Its output voltage obtained across the cathode resistor 120 and applied through resistor 121 to the grid of tube 122 is at a relatively low value and is not sufficiently high to overcome the positive bias voltage applied to the cathode of this tube from the (+BIAS) source. However, whenever tube 81 has the glow on its cathode No. 0, there is a positive voltage present on wire 123 which raises the grid potential of tube 118. The tube then conducts more current and provides a higher output cathode voltage to the grid of tube 122. The tube 122 thus has its grid-voltage raised above cutoff so that there is a voltage drop across its plate resistor 124 and a corresponding decrease in voltage on wire 125. When the glow of tube 81 transfers from cathode No. 0 to cathode No. 1, the grid voltage of tube 118 is reduced to its normal value, tube 122 again becomes cut off, and the plate voltage of this tube is then abruptly restored to (B+) as the plate current flow through resistor 124 ceases. A negative-going voltage variation therefore appears on wire 125 throughout each time that the cathode glow of tube 81 appears on cathode No. 0.

Delay unit No. 2 operates in a similar manner with the exception that the control grid of its tube 126 is connected through a resistor 127 and over wire 128 to cathode No. 1 of tube 81. Therefore, throughout the interval in each cycle that tube 91 of delay unit No. 2 is conductive, the associated tube 126 becomes conductive and effective to put a negative-going voltage variation on wire 125 each time that the tube 81 has its cathode glow on cathode No. 1. Delay unit No. 3, when it is conditioned later in the cycle, operates similarly to place a negative voltage variation on wire 125 each time that tube 81 has the glow on its cathode No. 2, and so on.

This mode of operation of the delay units is illustrated graphically by the waveform diagrams shown in Fig. 7. The square wave output of multivibrator 15 is shown at line A. This voltage waveform is applied as a keying input to the transmitter to produce the interrupted carrier signal shown at line M. Every twelfth pulse occurring at a time when the scale-of-twelve divider 19 has its glow on cathode No. 0 (see line D) the transmitter frequency is shifted to provide the distinctive station-call pulse. The delay unit driver 56 is organized to provide a positive-going trigger pulse as shown at line C each time that the glow on tube 81 transfers from cathode 10 to cathode 11. Assuming that a particular delay unit is gated to respond to one of these output pulses of the delay unit driver 56, its gas tube will be fired by such pulse as indicated at line E, and the firing of such tube will then extinguish the corresponding tube of the previous delay unit as indicated at line D. The delay unit made effective at this time as indicated at line E is assumed to be associated with the No. 0 cathode of the tube 81 so that it provides a negative-going voltage pulse as shown at line G each time that the glow of tube 81 is on cathode No. 0. The positive-going trailing edge of this pulse then provides a positive trigger pulse to drive the units station counter as shown at line H. Accordingly, a station gate under these circumstances extends from a few milliseconds after one station-call pulse until the corresponding time twelve pulse periods later as shown in the left-hand portion of line K.

At some later time in the cycle, another delay unit is gated by the station counters to respond to the trigger pulses provided by the delay unit driver. Its gas tube then is fired as shown at line F and this extinguishes the gas tube of the previous delay unit as shown at line E. Throughout this portion of the cycle negative-going pulses are shown at line G as being provided to the units station counter driver 130 during the time that the glow on tube 81 is on cathode No. 1 rather than cathode No. 0. The trigger pulses to drive the units station counter 104 then occur later so that the station gates are delayed an additional pulse period with respect to the station-call pulses as indicated by comparing lines L and M of Fig. 7.

When it is contemplated to provide a system comprising only a relatively small number of stations and with perhaps only one or two carrier repeater units, it is then not necessary to provide the additional delay in station gating. Under these circumstances, the various delay units shown in Figs. 4B and 4D may be omitted from the circuit organization. An electron tube amplifier comparable to the delay unit driver 56 may be provided with its control grid receiving an input from cathode No. 0 from tube 81. The output pulses of this tube can then be applied directly to the units station counter driver 130 with the result that the triggers on bus 147 supplying the units station counter 104 will then occur each time the glow on tube 81 transfers from cathode No. 0 to cathode No. 1.

When delay units are provided in the circuit organization, however, to provide the delay in station gating in the manner described, it becomes impossible to use one of the station periods in a cycle. This results from the fact that the conditioning of delay unit No. 1 at the beginning of each cycle has the effect of substantially shortening the particular station period in which the conditioning of delay unit No. 1 occurs. That particular station period is started at a time when some other delay unit such as delay unit No. 3, is conditioned so that the station period actually starts at a time which may be several pulse periods after the occurrence of the station-call pulse. However, as soon as delay unit No. 1 is conditioned, the next station period is begun directly after the next station-call pulse so that this particular station period is shortened and cannot, therefore, be used. For this reason, Fig. 4F does not short any storage bank for station No. 0.

When power is initially applied to the system, it is necessary that one of the delay units be conditioned to be effective in order that trigger pulses may be supplied to the units station counter 104 since, without such trigger pulses, the zero stages of both the units and tens station counters cannot have their tubes fired. And as long as these station counters cannot be put into operating condition with one of their old cathode tubes in a conductive state, no enabling gate can be provided for any of the delay units to permit their respective cold cathode tubes to be fired. For this reason, a connection is provided from the starter of tube 90 in delay unit No. 1 through resistor 135 and a normally open contact 136 of the start push-button 137 to (B+). Momentary closure of the start push button 137 after power is applied immediately fires gas tube 90 so that it is then possible for this delay unit No. 1 to provide the desired trigger pulses to the units station counter driver 130.

*Units station counter driver*

The units station counter driver 130 comprises the cold cathode tube 138 having its starter positively biased by being connected through resistor 139 and resistor 140 to the (+BIAS) voltage source. Resistor 140 is by-passed by the diode 141 to ensure that the negative-going leading edge of each pulse provided by the various delay units will not drive the starter of tube 138 below the voltage of the (+BIAS) source and thereby improperly fire the tube. At the positive going trailing edge of the pulse, however, a positive trigger appears on the starter which adds to the voltage continually provided by the connection to the (+BIAS) voltage source so that this tube is then fired.

The cathode of tube 138 is connected through resistor 142 to ground so that the cathode voltage is at ground level when tube 138 is nonconductive but rises quickly to some positive value when the tube is fired. The plate is connected through resistor 143 and then through the parallel combination of resistor 144 and capacitor 145 to (B+). Immediately upon the firing of tube 138, there is a flow of current through the discharged capacitor 145 and through resistor 143, from plate to cathode of tube 138 and resistor 142 in the cathode circuit, to ground. Capacitor 145 charges quickly, however, so that this current flow is quickly reduced. Resistor 144 is selected to have a large value of resistance so that, when capacitor 145 becomes fully charged, the total resistance in the plate-cathode circuit becomes so high that conduction can no longer be maintained. The tube then becomes extinguished. The time that it remains fired is dependent upon the time constant for charging of capacitor 145. Resistor 143 is provided to limit the plate-cathode current during the time the tube is fired to some preselected value. The cathode is also connected through rectifier 146 to the (+BIAS) voltage source so that the positive-going trigger pulse appearing at the cathode is prevented from exceeding the voltage of this source since any attempt of the cathode to rise in voltage above this level would cause the diode 146 to become conductive.

In summary, the tube 138 becomes momentarily conductive for each positive-going trigger pulse on its starter whose voltage, when added to the steady bias voltage on the starter, exceeds the ignition potential of the tube, After a brief interval, the tube extinguishes itself, but in the interim provides a positive-going pulse on its cathode whose amplitude is limited to a preselected value by means of the connection of the cathode through a diode to the (+BIAS) voltage source.

*Tens station counter driver*

These positive-going trigger pulses provided at the cathode of tube 138 are applied over bus 147 to the units station counter 104. Each of these trigger pulses is effective to cause the progression by a single step of the units station counter as will subsequently be described in detail. Whenever the counting capacity of the units station counter 104 has been reached by the successive application of these trigger pulses to bus 147, the tens station counter must be advanced a single step. To accomplish this, the tens station counter driver 148 is provided. This driver is similar to the driver 130 just described in that it is also effective when fired to provide a positive-going trigger pulse of limited amplitude on bus 149 to the tens station counter 105. To ensure that this advance of the tens station counter 105 will occur at the proper time, the cold cathode tube 150 is provided with a positive biasing voltage by connecting its starter through resistor 151, resistor 152, wire 153, and over bus 154 to the junction of resistors 155 and 156 in the cathode circuit of the cold cathode tube of stage No. 9 in the units station counter 104. Thus, whenever the units station counter 104 has counted nine pulses appearing on bus 147 so that it stands with its No. 9 tube fired, a positive biasing voltage is provided on the starter of tube 150. Being thus positively biased, this tube can be fired by the very next positive trigger appearing on bus 147 and applied through the coupling capacitor 157 and resistor 151 to the starter of tube 150. At such time, therefore, both the units station counter and the tens station counter receive trigger pulses causing them to advance one step. At this time, of course, the units station counter 104 is operated so that it is restored to its normal condition with the tube of its No. 0 step fired.

The units station counter 104 is a decade type of counting chain comprising one cold cathode tube for each of its ten steps. The tens station counter 105 is similar except that fewer steps may be provided in accordance with the desired capacity of the system. With four stages as shown in Fig. 4C, each cycle may comprise forty successive station periods.

The operation of cold cathode counting circuits of this kind has been fully described in my previous application Ser. No. 485,973, filed February 3, 1955 and will thus not be repeated in detail here. Briefly, it may be stated that successive input pulses appearing on the input bus such as bus 147 associated with units station counter 104 cause the step-by-step firing of the tubes of the counter. For example, if the tube of step No. 1 is fired, the next positive-going trigger pulse appearing on bus 147 causes the tube of step No. 2 to be fired since only this tube can have its starter then positively biased from the cathode circuit of the preceding stage. Because of the common anode circuit provided for all the tubes, the firing of any one tube results in the extinguishing of the tube of the immediately preceding stage.

Both the units station counter 104 and the tens station counter 105 provided in the central office apparatus shown in Fig. 4C are so organized that the last stage of the counter provides a bias to the starter of the first stage of the same counter. By this means, a repeat type of operation results because the next input pulse to the counter to occur when its last stage has its tube fired results in the firing of the tube of stage No. 0 of that counter. At the end of each cycle, therefore, both counters are automatically restored to their zero stages so that they are effective to count properly during the next cycle of operation.

*Synchronizing circuit*

The synchronizing circuit 27 shown in Fig. 4A comprises a one-shot multivibrator. Tube 70 in this multivibrator is normally conductive since its control grid is connected through resistor 161 to (B+); whereas the opposite tube 162 is normally maintained nonconductive by reason of the positive bias applied to its cathode through the connection to the voltage divider comprising resistors 163 and 164 between (B+) and ground. In this normal condition, the multivibrator provides a low resistance path to ground for the cathode of tube 68 in the multivibrator 15.

At the end of each cycle, the synch circuit driver 165 provides an input pulse to the grid of tube 70 that operates this multivibrator for a preselected time to its opposite condition. When in this condition, tube 70 of the multivibrator is nonconductive and the resulting high resistance to ground presented to the cathode of tube 68 causes the multivibrator 15 to become inoperative. After being triggered from its normal condition by the pulse applied to its control grid, tube 70 remains nonconductive for a length of time as determined by the time constant for the discharging of capacitor 166. At the end of this time, the multivibrator is restored to its normal condition with tube 70 again fully conductive, thereby permitting multivibrator 15 to resume operation. The synchronizing circuit 27 is thus effective to prevent generation of the keying pulses so that no transmission from the central office can take place for this brief interval at the end of each cycle of operation.

The synch circuit driver 165 is made effective to initiate this synchronizing period at the proper time in the cycle by being selectively gated from the units station counter 104 and the tens station counter 105. To do this, an "and" gating circuit is provided similar to that previously described in connection with delay unit No. 1 of Fig. 4B. The positive voltage obtained from (B+) and applied through resistor 167 to the junction point 168 is prevented from being dropped to near ground level only by the presence of positive voltages in the cathode circuits of stage No. 9 of the units station counter 104 and the last stage of the tens station counter 105. The junction point 168 is connected to these respective cathode circuits through the gating diodes 169 and 170. For an assumed capacity of forty station periods in a cycle, four stages would be provided in the tens station counter as shown in Fig. 4C. Accordingly, the tube of stage No. 3 of this tens station counter 105 and the tube of stage No. 9 of the units station counter 104 will both be conductive at the very end of each cycle and thereby permit the desired positive gating voltage to be applied through resistor 171 and resistor 172 to the starter of cold cathode tube 173 in the synch circuit driver 165.

Being thus positively gated, tube 173 can then be fired by the next positive-going output pulse appearing on bus 147 for the purpose of driving the units station counter 104. When tube 173 is fired, the normally high voltage present at the junction of plate resistors 174 and 175 of this tube is abruptly decreased so that a negative-going trigger pulse is applied through capacitor 176 to the grid of tube 70. It is this trigger pulse which causes the normally conductive tube 70 to be driven momentarily beyond cutoff, thereby instantly reversing the condition of this multivibrator.

The conducting current for the cold cathode tube 173 is provided mostly by the normally charged capacitor 177. When this capacitor has discharged, the anode-cathode current can be supplied only through the very large resistance of plate resistors 174 and 175. Then the resulting anode-cathode circuit resistance is too high to permit conduction to be sustained so that the tube is extinguished.

This action of the synchronizing circuit is shown in Fig. 6 at line E. On the last station period of a cycle, cold cathode tube 173 is positively biased as described so that the very next output pulse of the units station counter driver 130 (see line D) is effective to operate the multivibrator of the synchronizing circuit 27 and thereby stop the multivibrator 15 as shown at line A. During this interval, no output pulses are transmitted from the central office as indicated at line F. This period of silence results in the synchronizing of all the field stations as will later be described in detail.

*Cold cathode tube counters*

When power is first applied to the system, none of the cold cathode tubes in either of the station counters is conductive which means that none of the tubes is then being provided with an enabling bias permitting it to be fired by a positive pulse supplied to its input bus. To overcome this difficulty, a connection is provided from (B+), through the normally open contact 136 of the start push-button 137 of Fig. 4B to bus 178. Closure of this push-button 137 after power is applied to the system, causes a positive voltage to appear on bus 178 and be applied through resistor 179 and then through the two diodes 169 and 170 to the respective buses 154 and 180. Both these buses are thus raised in potential to provide positive bias on the starters of the tubes included in the No. 0 stages of both the units station counter 104 and the tens station counter 105. This positive bias resulting from actuation of the start push-button 137 permits both tubes of these stages to be fired by the next occurring positive trigger pulse on the respective input buses 147 and 149 provided for these two station counters.

*Reception of indications*

The indication code received from the various field stations comprises groups of carrier wave pulses as shown diagrammatically at line N of Fig. 6. Each station is effective to transmit either of two distinctive carrier frequencies on each of ten successive pulse periods. The transmissions from the various field stations occur in succession and are all applied to the carrier receiver 50 at the central office through the band-pass filter 12.

For each space pulse applied to the receiver input, an output voltage appears on wire 181, and this voltage is of positive polarity and has a duration corresponding to the duration of the corresponding carrier wave pulse. A similar voltage pulse appears on wire 182 for each occurrence of a mark pulse input in the receiver input.

The pulses on wire 181 are applied through capacitor 183 and through resistor 184 to the control grid of tube 185 included in the step counter driver 51. The output pulses corresponding to marks and appearing on wire 182 are similarly applied through the coupling capacitor 186 and resistor 187 to the control grid of tube 185. This tube 185 is normally biased to a nonconductive condition by having its cathode connected directly to the (+BIAS) voltage source. However, each positive excursion of its control grid occurring in response to either a mark or space pulse in the receiver input causes the tube to become conductive so that its normally high plate voltage is reduced in value. Capacitor 188 connects the plate of this tube to ground to filter out any high frequency spurious signals that may be present.

Each negative-going voltage variation at the plate of tube 185 as it is driven conductive is applied through the differentiating capacitor 189 and through resistor 190 to the grid of the differentiating pulse former comprising tube 191. A positive-going trigger pulse appears at the plate of this tube for each such negative-going voltage variation at the plate of tube 185, and the width of such positive pulse is determined by the time constant for the discharge of capacitor 189. Tube 191 has its plate connected through coupling capacitor 192 to a clamping circuit organization comprising resistor 193 and diode 194 in parallel to ground and another connection from the junction of capacitor 192 and resistor 193 through diode 195 to the (+BIAS) voltage source. The lower level of the trigger pulses is thereby clamped to ground by diode 194 and their upper limit is clamped to the (+BIAS) voltage level by the connection provided through diode 195 to this voltage source.

The effect of this step counter driver 51, therefore, is to provide a positive-going trigger pulse for each occurrence of either a mark or a space pulse in the code received from any field station. These positive-going trigger pulses are applied over bus 196 to each of the stages of the step counter 52 shown in Fig. 4E. This step counter 52 is similar to the units station counter 104 shown in Fig. 4C and briefly described previously. Each trigger pulse on bus 196 causes the step counter to advance a step so that the conductive condition of the tube of any stage is transferred to the tube of the next stage. Since ten indication pulses are received on each station period ten positive-going trigger pulses appear on bus 196 and cause the step counter to be operated through all of its ten steps.

As already described, the delay units are effective to ensure that the station gates provided by the two station counters always encompass the entire indication code received during any station period. This means that the trigger pulse for driving the units station counter 104 at the beginning of each station period occurs somewhat prior to the reception of the first indication pulse. Therefore, each driving pulse for the units station counter may be utilized as a resetting input on the step counter 52. To accomplish this, each positive-going trigger pulse that appears on bus 147 of Fig. 4C and is applied to the units station counter 104 is also supplied as a resetting input to the No. 0 stage of the step counter 52. These pulses are applied through the coupling capacitor 197 and through resistor 198 to the starter of the tube of step No. 0 of the step counter. The required positive bias that must be provided to ensure that this trigger pulse will be effective to fire the first tube of the step counter is obtained by connecting the starter through resistor 198 and resistor 199 to the (+BIAS) source of voltage.

Figure 4E:
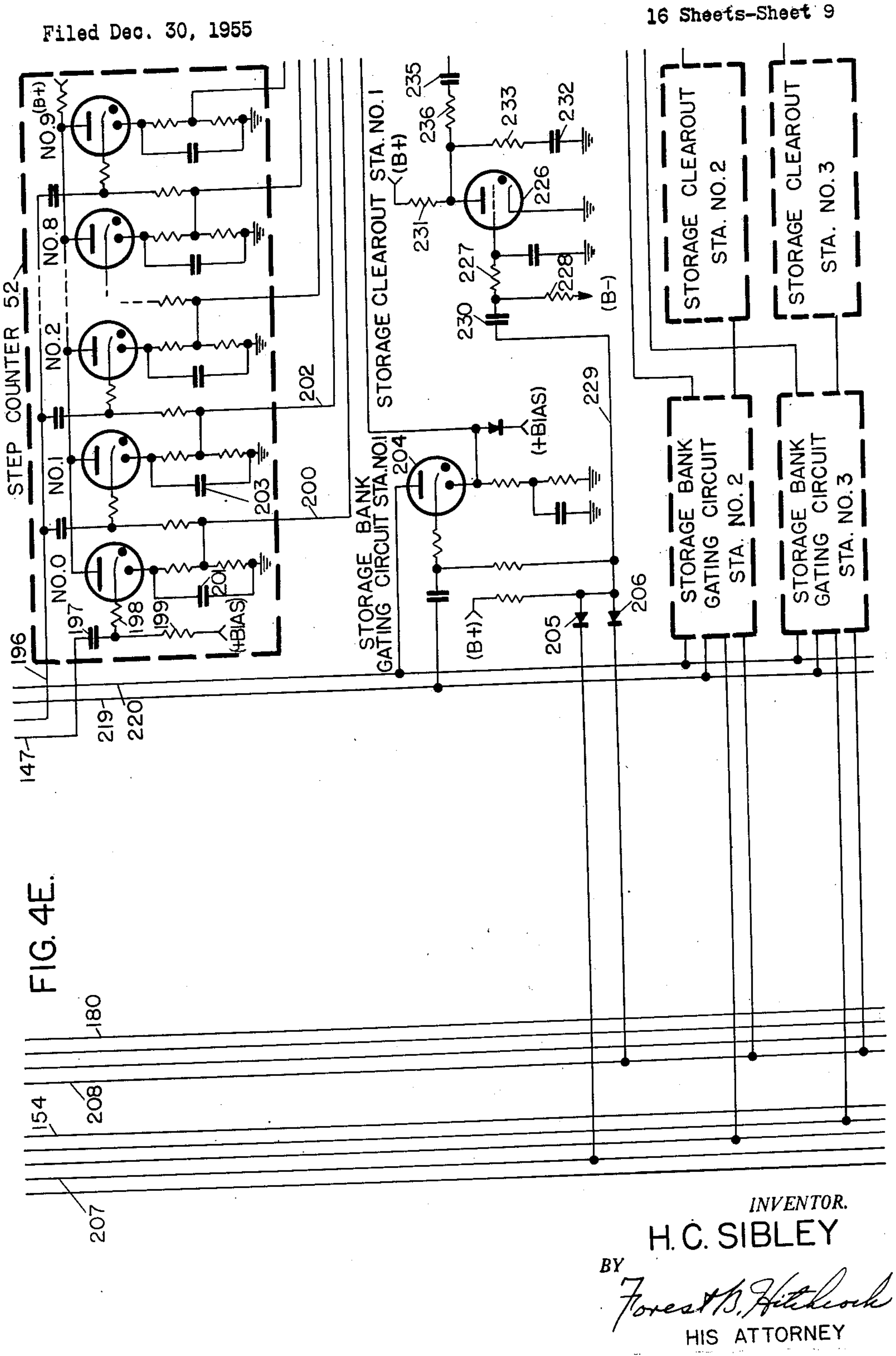
Figure 4F:
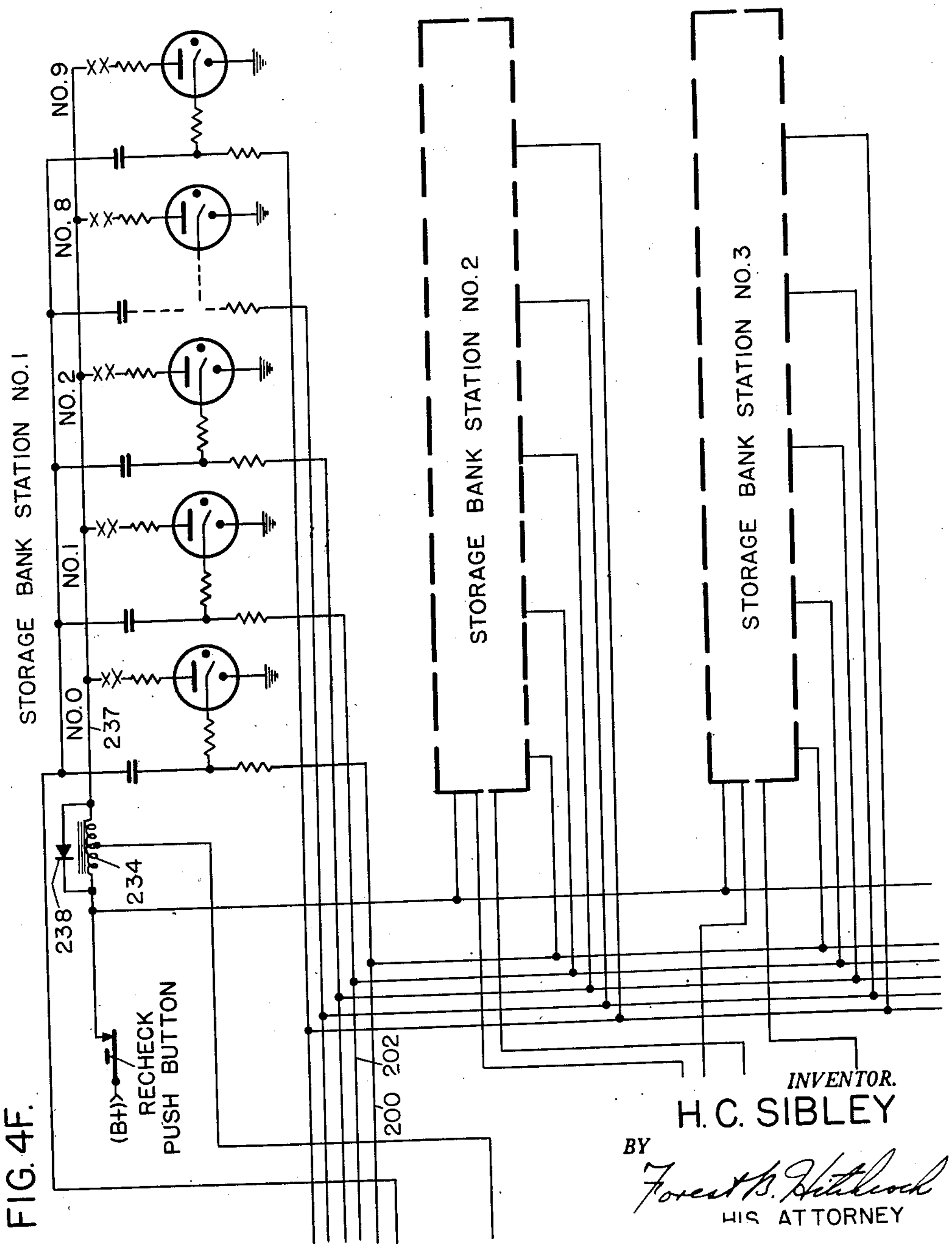

As shown in Fig. 4F, a plurality of storage banks are provided, one bank for each station period in the system. Each of these storage banks includes ten cold cathode storage tubes, one for each of the ten indication pulses received in a station period. These individual storage tubes are all successively gated in turn by the respective stages of the step counter 52. Upon the occurrence of the first indication pulse from any field station, the tube of step No. 0 of the step counter is conductive and provides a positive voltage on bus 200, and this positive voltage is then applied through respective decoupling resistors to the starter circuits of all the No. 0 storage tubes of the different storage banks. This first indication pulse is also effective on its leading edge to provide a positive-going trigger pulse on bus 196 from the step counter driver 51 of Fig. 4A. This step counter trigger causes the step counter to advance one step by firing the tube of its stage No. 1 while at the same time extinguishing the tube of its No. 0 stage. Particularly because of the capacitors connecting the cathodes of these tubes of the step counter to ground, the effect of the stepping operation is not immediate in its gating action on the storage units. The voltage on bus 200 cannot immediately return to ground because of the effect of capacitor 201 in the cathode circuit of the No. 0 stage. At the same time, the voltage on bus 202 cannot immediately rise from ground level because of the effect of the cathode capacitor 203. Therefore, the tube of the No. 0 stage of each storage bank remains gated for some time following the leading edge of the first indication pulse, and this interval is long enough that a pulse occurring in response to a mark on the first pulse period will fire the tube of stage No. 0 and not the tube of stage No. 1.

The input pulses to each storage bank occurring in response to marks in the received indication code are supplied by an associated storage bank gating circuit illustrated in Fig. 4E. This gating circuit comprises a cold cathode tube having its control grid selectively gated from the two station counters on the respective station periods. The storage bank gating circuit provided for station No. 1 includes the cold cathode tube 204 which has its starter selectively gated with an "and" gating circuit by the connections provided through the diodes 205 and 206 to the respective buses 207 and 208. These two buses are associated, respectively, with the No. 1 stage of the units station counter 104 and the No. 0 stage of the tens station counter 105. This tube 204 therefore has the required positive bias on its starter only throughout the No. 1 station period in the cycle provided for the reception of indications from the No. 1 field station. Each of the additional storage bank gating circuits is gated in a similar manner to respond on its respective station period.

Tube 204 of the No. 1 station storage bank gating circuit as well as all the other such storage bank gating circuits receives a positive gating voltage on its anode and a positive-going trigger pulse on its starter for each occurrence of a mark pulse in the code received during the respective station period. The positive anode gating voltages are provided by the anode gating amplifier 209 while the starter triggers are supplied by mark amplifier 54 of Fig. 4A. The mark amplifier 54 comprises triode amplifier tube 210 which is normally biased to a cut-off condition by the connection of its cathode to the (+BIAS) source of voltage. The grid of this tube is connected through resistors 211 and 212 to ground. The junction of these two resistors is connected through coupling capacitor 186 to the mark output lead 182 of the carrier receiver 50. For each occurrence of a mark in the received code, a positive-going voltage pulse is applied through capacitor 186 to the grid of tube 210 and causes this tube to become conductive. The normally high plate voltage of this tube occurring when in its nonconductive state is abruptly lowered in value so that negative-going voltage variations are applied through the differentiating capacitors 213 and 214 and through respective resistors 215 and 216 to the control grids of the two tubes 217 and 218, respectively. Both of these tubes are operated as differentiating pulse forming circuits so that they provide positive-going trigger pulses at their plate for each negative-going voltage variations at the plate of tube 210. The trigger pulses on bus 219 are limited in amplitude by the clamping circuit including the resistor 221, diodes 222 and 223, and capacitor 224 whose effect is similar to that previously described with other clamping circuits of this kind.

For each mark pulse in the received indication code, therefore, the plate of each cold cathode tube in the various storage bank gating circuits is made positive and at the same time the starter of each tube is provided with a positive-going trigger pulse. The particular one of these tubes that is then gated by being provided with the required positive bias on its starter from the output buses of the two station counters then is momentarily fired. By providing a gating voltage to the plate of the tube in addition to the trigger pulse to the starter, the length of time that the tube remains fired is more precisely demarcated and results in output pulses being provided at the cathode that have relatively steep trailing edges which ensures that there will be no overlap and that each pulse provided for the respective storage bank will be effective only on the properly gated cold cathode tube of that storage bank.

Associated with each storage bank gating circuit is a storage clear-out such as the storage clear-out for station No. 1 comprising gas discharge tube 226. This tube is biased to be normally nonconductive by having its control grid connected through resistors 227 and 228 to the (B−) source of voltage. Whenever the required gating voltage is present on the starter of the cold cathode tube included in the corresponding storage bank gating circuit such as cold cathode tube 204, this positive gating voltage is also applied over wire 229 and through capacitor 230 and resistor 227 to the control grid of the gas discharge tube 226. A positive-going pulse then appears on the grid of tube 226 so that it is fired and its plate voltage experiences a sudden drop. The plate resistor 231 is of a large value of resistance, and the plate current for the tube is provided momentarily almost entirely by the normally charged capacitor 232 which is connected in series with current limiting resistor 233 from the plate of the tube to ground. After the capacitor 232 has been partially discharged, the plate voltage is reduced to a very low value and it is believed that an inductively caused overshoot occurs so that the plate-cathode voltage momentarily goes below the minimum value required to maintain the tube conductive. The tube is therefore, automatically extinguished a short time after being made conductive. During the interval that this tube is conductive it also draws current from (B+), through the left-hand portion of the inductor 234, capacitor 235, resistor 236, and the plate-cathode circuit of tube 226 to ground. By this means, a voltage is induced in the inductor 234 which momentarily reduces the voltage on bus 237 to such a low value that all the then conductive tubes of the storage unit for station No. 1 are extinguished. Diode 238 connected in parallel with inductor 234 prevents the voltage on bus 237 from becoming more positive than (B+) and thereby falsely firing the storage tubes.

At the very beginning of each station period, therefore, the storage clear-out provided for that station period has its gas discharge tube made conductive by an "and" gating circuit connected to preselected stages of the station counters. The momentary conductive condition of this tube results in the extinguishing of all the cold cathode tubes of the storage bank provided for that station period. All previously stored indications are thereby erased and the tubes of the storage bank are then selectively fired in turn again in accordance with the particular pattern of marks and spaces occurring in the indication code for that station.

Figs. 10A and 10B illustrate how either indication lamps or electromagnetic relays may be controlled on the different steps by the storage tubes provided in each storage bank. In Fig. 10A, the plate of a cold cathode storage tube is shown as being connected through a resistor 240 and through the parallel combination of capacitor 241 and the primary winding of a saturable reactor 242 to bus 243. When cold cathode tube 244 is nonconductive, there is no flow of current through the primary winding of the saturable reactor 242 so that the secondary winding of this reactor presents a high impedance to the flow of alternating current in the secondary circuit. As a result of this high impedance, insufficient current flows in the secondary circuit to illuminate the indication lamp 245. When tube 244 is fired, however, the opposite conditions prevail. The flow of plate current through the primary winding then reduces the impedance presented by the secondary winding to such an extent that sufficient current from the A. C. source flows through the filament of lamp 245 to illuminate this lamp. Thus, a visual indication is given of the conductive condition of cold cathode storage tube 244.

A capacitor 241 shunts the primary winding of the saturable reactor 242. When tube 244 becomes momentarily nonconductive on each cycle just as the new indication code for the associated field station is received, the charged capacitor discharges through the primary winding to hold this winding momentarily energized. As a result, the indication lamp 245 remains illuminated even though tube 244 is momentarily extinguished. Of course, if tube 244 remains extinguished for an appreciable length of time, capacitor 241 becomes fully discharged and can then no longer supply current to the primary winding of saturable reactor 242. In that event, the lamp 245 is extinguished.

When it is desired to control an electromagnetic relay rather than an indication lamp in accordance with the condition of a cold cathode storage tube, the circuit organization shown in Fig. 10B may be used. The plate of the cold cathode storage tube 246 is then connected through the winding of an indication relay 247 to a source of (B+) energy represented by (B+). When the tube is nonconductive, the relay is dropped away; when tube 246 is fired the relay is picked up. Resistor 248 and diode 249 connected in parallel with the winding of relay 247 provide this relay with slow releasing characteristics. As a result, this relay remains picked up even though the cold cathode storage tube is made momentarily nonconductive for a brief interval on each cycle at the time it receives a new indication code from the associated field station. Diode 249 has the added function of preventing any inductive overshoot from momentarily making the plate voltage of tube 246 go highly positive and thus falsely firing this tube. Resistor 248 facilitates the firing of tube 246 since it permits current to be instantly provided through the plate-cathode circuit when the tube has its starter triggered. If resistor 248 were not provided, the inductance of the winding of relay 247 would prevent an immediate flow of current so that the tube would not fire properly.

*Field station apparatus*

The stream of pulses that the central office transmits during each cycle is received at each field station and applied through a band-pass filter 14 to the carrier receiver 30. For each occurrence of a timing pulse, a positive-going voltage variation appears on wire 255, while a similar positive-going voltage variation appears on the output wire 256 for each occurrence of a station-call pulse. The receiver output pulses corresponding to the occurrences of timing pulses are applied through a coupling capacitor 257 and resistor 258 to the control grid of triode tube 259 in the step pulse former 31. The control grid is connected through the grid leak resistor 260 to ground. The cathode is connected through resistor 261 to the cathode of cold cathode tube 262 in the station cutoff 36. As will later be described in detail, this cold cathode tube 262 is conductive during a cycle except for the ten pulse period interval that the station is actually transmitting its indications to the central office. Therefore, a positive voltage exists normally at the cathode of this tube thereby, in effect, raising the lower level of voltage of the voltage divider comprising the cathode resistor 261 and resistor 263 which is connected directly to (B+). When tube 262 is conductive, therefore, the cathode voltage of amplifier tube 259 is so high above ground that this tube cannot become conductive in response to output pulses from the receiver 30. However, during the interval that the station is conditioned to transmit its indications, cold cathode tube 262 is nonconductive so that the voltage on wire 264 is at ground level. This sufficiently lowers the voltage on the cathode of tube 259 that a positive-going voltage pulse from the receiver can make this tube conduct. When this occurs, the high plate voltage that this tube normally has because of its being nonconductive is abruptly lowered in value.

The output voltage at the plate of tube 259 is applied through a differentiating capacitor 265 to the control grid of tube 266 which, with tube 267, forms a one-shot multivibrator. In this multivibrator, tube 266 is normally conductive because its grid is connected through resistor 268 to (B+). Tube 267, on the other hand, is cut off since its grid is at a low potential because of being connected to the plate of the conducting tube 267 through resistor 269 while its cathode at the same time is above ground because of being connected to the junction of resistors 270 and 271 which are connected in series between (B+) and ground. The negative-going voltage variation appearing at the plate of tube 259 upon each leading edge of the pulses applied to its grid causes tube 266 to be momentarily cut off. This initiates an instant reversal of state of the multivibrator so that tube 266 becomes immediately nonconductive while tube 267 becomes conductive. After an interval, whose length is determined by the time required for capacitor 272 to discharge, the multivibrator is restored to its initial condition. The circuit constants are chosen such that the resulting voltage pulse at the plate of tube 266 is substantially equal to the length of the output pulse provided by the carrier receiver 30. The principal function of the multivibrator in this step pulse former 31 is to reshape the output pulses of the receiver and provide a positive-going square wave pulse at the plate of tube 266 for each voltage pulse applied to the grid of tube 259.

On the negative-going trailing edge of each positive pulse at the plate of tube 266, a positive-going trigger pulse is provided by the differentiating pulse forming circuit including tube 273. The amplitude of these pulses is limited to the desired value by means of the usual clamping circuit including capacitor 274, resistor 275 and the two diodes 276 and 277.

The phase relationships are illustrated diagrammatically in Fig. 6. Since tube 273 provides at its plate a positive-going trigger pulse for each negative-going trailing edge of the output pulse appearing at the plate of the multivibrator tube 266, these trigger pulses which are applied to the input bus 278 of the step counter 35 occur with their leading edges substantially coincident as shown at line J, with the trailing edges of the output pulses of the receiver as indicated at line G.

The step counter 35 is similar to the counters previously described in connection with the central office apparatus. One exception to this is that the cathode of each tube is connected through three series resistors to ground instead of two. This has been done to provide a somewhat lower value of gating voltage on the output buses connected to the junction of the two lower resistors for the respective tubes. Another exception is that this counter is not a repeat type of counter in that the last stage does not provide bias for the first stage to thereby effect the continuous chain type of counting operation.

The station cutoff 36 including tube 262 is clearly shown in Fig. 8A as being in effect an extra, eleventh stage of the counter. When the step counter has been conditioned on some preselected station period to respond to the timing pulses it receives on that station period, the step counter is operated step-by-step through all its steps. In response to the tenth trigger pulse on bus 278, cold cathode tube 262 in the station cutoff is fired, at the same time extinguishing the tube of the No. 9 step of the step counter. The step counter then remains in an inactive condition with all its counting tubes extinguished unit it is again gated by the units and tens station counters of Fig. 8B to respond to further stepping pulses supplied it by the step pulse former 31.

Since the initiation of operation of the step counter is thus dependent upon receiving the proper gating voltages from the station counters of Fig. 8B, it is deemed advisable to first describe how these station counters are operated. The station-call pulse output of the receiver, comprising a positive-going voltage variation for each station-call pulse transmitted from the central office, is applied over wire 256 and through the coupling capacitor 279 as well as resistor 280 to the starter of cold cathode tube 281 in the units station counter driver 282. The starter of this tube is positively biased by the voltage divider comprising resistors 283 and 284 so that each positive-going voltage pulse on wire 256 causes tube 281 to fire and provide a positive-going trigger pulse at its cathode. This tube is provided with the customary self-extinguishing circuit means including the parallel-connected resistor 285 and capacitor 286 in its anode circuit. Furthermore, the amplitude of the positive-going trigger pulses at the cathode is limited by the clamping circuit including diode 287 which connects the cathode to the (+BIAS) source of voltage.

These output trigger pulses are applied to the input bus 288 of the units station counter 289. This bus connects through respective coupling capacitors to the starters of all the cold cathode tubes of this units station counter after the first. This counter is reset once each cycle during the synchronizing period of silence by a resetting pulse applied to the starter of the tube of its No. 0 stage, and this resetting pulse is obtained from the synch period detector 44 as will later be described. Starting with the tube of the No. 0 stage conductive, successive input triggers on bus 288 are effective to produce a step-by-step operation of this counter. This units station counter is organized to operate as a repeat type of counter; for this purpose the starter of the tube of stage No. 0 is connected through resistor 290 and resistor 291 to the junction of resistor 292 and 293 in cathode circuit of the tube in the No. 9 stage. Whenever this counter stands with its No. 9 stage tube conductive, a trigger pulse at the cathode of tube 281 is applied through diode 294 to wire 295 and thence through capacitor 296 and resistor 290 to the starter of the No. 0 stage tube to make this tube conductive. It is necessary that the trigger pulse to operate the No. 0 stage be applied through the diode 294 to wire 295 rather than to trigger this stage No. 0 from the regular input bus 288. This latter cannot be done since the starter of the No. 0 stage tube must be brought out separately from the rest so that it alone can receive a resetting pulse once each cycle from the synch period detector 44.

The No. 9 stage of the units station counter 289 also provides a positive bias to the starter of tube 297 in the tens station counter driver 298 whenever it is in a conductive state. The next occuring trigger pulse at the cathode of tube 281 is then effective through the coupling capacitor 299 and resistor 300 to fire this tube and provide a positive-going trigger pulse at its cathode that is effective over the bus 301 to produce a step-by-step progression of the tens station counter 302. The restoration of the units station counter 289 on each tenth station-call pulse is in this way accompanied by the advance of one step on the tens station counter 302. These two counters always represent by their combined conditions the particular station period then in progress in the cycle.

At the end of each cycle of operation, there is a synchronizing period in the cycle which results from not transmitting any pulses to the field station for a brief interval. The synch period detector 44 at each field station is organized to detect this period of silence and, when it has done so, to reset both the units and the tens station counters at that field station. The synch period detector includes the triode vacuum tube 303 which is normally biased to be nonconductive by having its cathode connected to the junction of resistors 304 and 305 connected between (B+) and ground.

The timing pulses supplied by the receiver are applied over wire 255 and through capacitor 306 as well as resistor 307 to the control grid of this tube 303. Each time that this tube is made conductive by a positive-going voltage pulse on wire 255, capacitor 308 connected from the plate to ground discharges through the plate-cathode circuit. When the tube becomes nonconductive between pulses, this capacitor can charge only through the relatively high resistance of the plate resistor 309 so that it cannot fully charge between timing pulses occurring at their usual rate. In other words, this capacitor recovers between successive timing pulses only a small part of the charge that it loses through the plate cathode circuit of tube 303 each time this tube becomes conductive in response to a timing pulse. Normally, therefore, when timing pulses are being continually received during a cycle, the plate voltage of tube 303 is at a very low value so that the cold cathode tube 303 cannot be fired. In the synchronizing period when no pulses are received from the central office, the capacitor 308 has ample time to charge through resistor 309 so that the voltage at the starter of cold cathode tube 310 can rise high enough to fire this tube. When this occurs, plate cathode current for the tube is drawn through the lower portions of inductor 311 and through the coupling capacitor 312. Because of the autotransformer action of inductor 311, a relatively large positive-going voltage variation appears on wire 313 which is applied through coupling capacitor 314 to the cold cathode tube of stage No. 0 of the tens station counter 302. The pulses are also applied through the D. C. blocking capacitor 315 and diode 316 to wire 295 over which they are applied through capacitor 296 to the starter of the tube of stage No. 0 of the units counter 289. In this way the units station counter as well as the tens station counter is reset in the synchronizing period. The resetting triggers are made sufficiently large to restore these counters both to their zero conditions independent of any positive bias on their No. 0 stage tube starters.

On any station period that it is desired to have a field station transmit indication code pulses to the central office, it is necessary to gate the stage No. 0 tube starter of the step counter 35 from the two station counters of Fig. 8B. Fig. 8A shows how these gating connections would be provided to have the apparatus conditioned to transmit indications on the thirteenth station period of each cycle. On the twelfth station period, the tubes of stage No. 1 in the tens station counter 302 and of No. 2 in the units station counter 289 are both conductive. Positive voltages then appear on both wires 318 and 319. The positive voltage on wire 319 is applied through diode 320 to the junction of resistors 321 and 322. A positive voltage then appears at the upper terminal of resistor 322, but the level of this voltage is determined in accordance with whether wire 318 is then at a positive voltage or is at ground potential. If wire 318 is at ground potential, the positive voltage existing at the junction of resistors 321 and 322 is largely dropped across resistor 321 so that the voltage at the upper terminal of resistor 321 is then only slightly above ground. If the voltage on wire 318 is above ground, then the positive voltage at the junction of resistors 321 and 322 is not appreciably dropped so that a positive gating voltage can be applied through diode 323 and resistors 324 and 325 to the starter of the No. 0 stage tube. With this tube gated positively on its starter, the next trigger pulse supplied by the units station counter driver 282 over wire 326 and through capacitor 317 and resistor 325 will make the tube conductive. This pulse occurs at the beginning of the next or thirteenth station period. After this, the step counter will remain with the tube of its stage No. 0 conductive until there is a trigger pulse on bus 278 occurring in response to the first timing pulse following such next station call pulse. This pulse transfers the conductive condition to stage No. 1.

When the tube of stage No. 0 is fired by the trigger pulse on wire 326, cold cathode tube 262 of the station cutoff 36 is immediately extinguished. As successive step trigger pulses appear on bus 278, the conductive condition initially present on stage No. 0 is transferred to the successive stages. When stage No. 9 has its tube fired, it provides the required positive biasing voltage for the starter of tube 262 in the station cutoff so that the next step trigger pulse can fire this tube. When this happens, tube 259 of the step pulse former 31 is made nonresponsive to further input pulses appearing on its control grid so that additional step trigger pulses cannot be formed.

Another effect of having tube 262 of the station cutoff 36 conductive except when the station is to transmit is that the high cathode voltage provided by this tube is applied over wire 327 and through resistor 328 to the control grid of triode 329. This tube 329 is operated as a cathode follower whose output cathode voltage is at a low value when the grid is near ground as occurs when tube 262 is nonconductive. Both grid and cathode potential of this tube arise together to an appreciably higher level when tube 262 is in a conductive state. Whenever the cathode voltage of tube 329 is appreciably above ground, i. e. whenever the field station is not transmitting indications, the positive cathode voltage of tube 329 is applied over wire 330 to the oscillator included in carrier transmitter 33. This positive voltage acts on the oscillator to make it inoperative. This may be accomplished in various ways well known in the art and in one embodiment of this invention was done by applying the positive voltage as a disabling bias to the cathode of the oscillator tube in the carrier transmitter. The elevated cathode potential of tube 329 is also applied through diode 331 and resistor 332, front contact 333 of the check relay CK, and winding of this relay to ground. Capacitor 334 is connected across the winding of relay CK when it is picked up so that it is charged to the same voltage that appears across the relay winding.

During the time that the station is transmitting its indications, the voltage at the cathode of tube 329 can quickly be lowered in response to the extinguishing of tube 262, and this removes the blocking effect on the oscillator in the carrier transmitter. The capacitor 334 cannot, however, quickly discharge through the cathode resistor 335 of tube 329 because of the blocking effect of diode 331. Capacitor 334 can discharge at this time only through front contact 333 of relay CK and through the winding of relay CK to ground. This discharging of capacitor 334 causes the relay to remain steadily energized for the relatively short period of time that the station is transmitting its indications. Capacitor 334 has a sufficiently large value of capacitance that it can maintain relay CK energized even if the field station apparatus is organized to cause the field station to transmit indications on several successive station periods.

If, for any reason, the station cutoff 36 becomes ineffective to control tube 329 in such a manner as to block the oscillator in the carrier transmitter such as by a failure of either tubes 262 or 329 to conduct or by a failure in the step counter which prevents it from completing its stepping operation and thereby firing tube 262, then relay CK will drop away. As soon as this occurs, the voltage from (B+) that is normally applied through front contact 336 of this relay to wire 337 and thence to the output tubes of the transmitter 33 is removed. The carrier transmitter is, in this way, prevented from transmitting at a time in the cycle when the field station should be silent and not applying any coded carrier to the line wires.

An additional feature is provided, however, which causes the field station to intermittently attempt to restore itself to the normal operating condition after a predetermined waiting period. Even if the circuit fault which caused relay CK to drop away is a momentary one, the check relay is, nevertheless, prevented from picking up immediately since it cannot be energized through the normal holding circuit when its own front contact 333 has opened. The closing of back contact 336, however, causes the winding of relay TE to be energized. This relay is a thermal time element relay which is actuated and closes its front contacts at some preselected time interval after being energized. This delay time may be selected to be of any desired length and was, in one embodiment of this invention, selected to be an interval of approximately thirty seconds duration. When relay TE does finally pick up, an alternate pick-up circuit is provided for relay CK through the closed front contact 338 of relay TE. If relay CK can then pick up, its front contact 333 will again close to hold the relay energized. At the same time, the alternate pick-up circuit for relay CK comprising contact 338 is opened the time element relay is immediately deenergized as a result of the opening of back contact 336.

The square wave output pulses of step pulse former 31 appearing on wire 339 are applied to one input lead of the carrier transmitter 33. As the voltage on this wire alternates between its upper and lower levels, the carrier transmitter is keyed on and off, respectively. On each such step, a space pulse is transmitted at the 11.25 kc. carrier frequency unless another positive-going input pulse appears concurrently on wire 340 at which time a 10.75 kc. mark pulse is transmitted. Whether or not a voltage pulse appears on wire 340 on any pulse period is determined in accordance with the conditions of the indication relay contacts whose operation is illustrated in Fig. 8B. A plurality of output buses of the step counter 35 are provided, one for each stage of the counter. Whenever the tube of the corresponding stage is fired, the output bus is raised in potential. This positive voltage on the bus will also appear on wire 340 if the indication contacts between that bus and wire 340 are closed. As one example, when the tube of stage No. 2 of the step counter is fired, there is a positive voltage on bus 341, but this positive voltage can appear on wire 340 only if back contacts 342 and 343 of relays NWP and RWP are both closed. On each pulse period, therefore, a positive gating voltage appears on wire 340 to gate the transmitter for the transmission of a mark pulse only if a closed circuit condition exists with respect to the indication contacts related to that particular pulse period; otherwise a space pulse is transmitted.

Fig. 9A illustrates how any field station can be organized to transmit indication codes on a plurality of different station periods. The flexibility thus provided makes it possible to transmit any desired number of indications from a single field station.

To accomplish this, it is only required that the No. 0 stage of the step counter have its cold cathode tube gated to provide the required positive bias on the particular station periods that the station is to transmit indications. Briefly, it may be stated that this is accomplished by establishing an "or" gate with respect to the different stages of the units station counter that are involved and combining this through an "and" gate with the particular stage of the tens station counter that is involved. An additional gating circuit may be provided for station periods occurring in a different tens group.

To illustrate more specifically how this is accomplished, Fig. 9A shows how the gating function may be accomplished to cause a typical field station to transmit indications on the station periods Nos. 29, 30, 31, and 32. In order that the station will be able to transmit on these particular station periods, the step counter must have its No. 0 stage gated during the respective preceding station periods, i. e. station periods Nos. 28–31. Therefore, connections are provided from the cathodes of the tubes of stages No. 8 and No. 9 of the units station counter 289 and through respective diodes 347 and 348 to wire 349. Whenever this units station counter stands with the tubes of either of these last two stages conductive, a positive voltage appears on wire 349; if neither of these tubes is conductive, wire 349 is substantially at ground potential. The positive voltage on wire 349 is applied through resistor 350 to junction period 351 but will be reduced to substantially ground level by the drop across resistor 350 if wire 352, connected to junction point 351 through diode 353, is permitted by the No. 2 stage of the tens station counter 302 to be at ground level. If this No. 2 stage of the tens station counter has its cold cathode tube conductive, however, the voltage on wire 352 will be above ground, and this prevents the voltage at junction point 351 from decreasing appreciably below that appearing on wire 349. Under these circumstances, a positive voltage is applied through diode 354 in the forward direction and through resistors 355 and 356 to the starter of the No. 0 stage tube. A similar gating circuit is provided which connects to the No. 3 stage of the tens station counter and to the No. 0 and No. 1 stages of the units station counter. Only if the stage No. 3 of the tens station counter has its tube conductive and either the tubes of stages No. 0 and No. 1 of the units station counter are conductive can a positive voltage be applied through diode 357 in a forward direction to positively bias the starter of the tube of stage No. 0 of the step counter.

On each of these station periods that this tube is positively biased in this way, the next occurring station-call pulse effective to produce an input trigger to the station counters will also cause a positive trigger pulse to be applied through capacitor 317 and resistor 325 to the starter of the No. 0 stage tube so that this tube will be fired. The firing of this tube then extinguishes tube 262 of the station cutoff 36 so that the station becomes conditioned to transmit its indication code.

Fig. 9B illustrates how different groups of indication contacts may be made effective on different station periods to formulate the pattern of marks and spaces transmitted to the central office. Positive voltage pulses appear successively on the buses shown which are connected to the respective stages of the step counter as indicated. These voltages are applied through respective isolating diodes such as the diode 358 associated with the step No. 9 bus, and each positive voltage pulse then appears at the junction points 359 or 360 dependent upon the conditions of the indication contacts selectively connecting this junction point to the respective buses. The right-hand terminal of resistor 361 is connected to the cathode of the cold cathode tube of stage No. 3 of the units station counter through diode 362, and is also connected similarly to the tube of stage No. 2 of the tens station counter through diode 363. Unless both these stages have their tubes conductive, any positive voltage at the junction point 359 is, in effect, prevented from appearing at point 364. This means that the indication contacts in the left-hand portion of Fig. 9B which causes voltage pulses on the step counter output buses to appear selectively at point 359 can only appear on wire 365 and then be applied through diode 366 to the mark input of the carrier transmitter on the twenty-third station period of each cycle. Similar connections are provided to establish a gating circuit for the other group of indication contacts shown in the right-hand portion of Fig. 9B. This gating circuit connects instead to the cathode of the tube of stage No. 4 of the units station counter 289 so that these indication contacts can be effective only on the twenty-fourth station period of a cycle. Additional groups of indication contacts may be gated in a similar manner to cause them to be effective at the proper time in the cycle to formulate the indication code desired to be transmitted.

Fig. 11 illustrates how a plurality of visual indicator lamps, one for each field station in the system, may be provided at the central office to indicate proper functioning of the apparatus at the respective field stations. Each of these lamps receives a positive-going trigger pulse applied to it over bus 367 at the end of each station period in the cycle. Output buses of the units station counter 104 and the tens station counter 105 selectively gate these indication lamps so that each lamp can be illuminated only on the particular station period designated for it.

The trigger pulses on bus 367 are obtained from the cathode of a cold cathode tube 368. The starter of this tube is positively biased through resistors 369 and 370 from the cathode of the cold cathode tube of the No. 9 stage of the step counter. This starter also receives positive-going trigger pulses from the step counter driver 51 that are applied through capacitor 371 and resistor 369 to its starter. Therefore, the step trigger pulse immediately following the one that resulted in the firing of tube of stage No. 9 of the step counter, fires this tube 368. Tube 368 is provided with a self-extinguishing circuit means in its cathode circuit which operates in the manner previously described so that a positive-going trigger pulse appears at its cathode. The usual clamping circuit including diode 372, resistors 373 and 374 and capacitor 375 limit the amplitude of this trigger pulse.

Each trigger pulse is applied through a capacitor such as capacitor 376 to one terminal of the associated neon indicator lamp 377. Unless both the No. 0 bus of the tens station counter 105 and the No. 1 bus of the units station counter 104 are then raised in potential indicating that the No. 1 station period is then in progress, the required positive bias voltage will not be present at the upper terminal of indicator lamp 377. Without this positive bias voltage, the lamp 377 cannot be fired by the trigger pulse of limited amplitude appearing on bus 367. Under normal operating conditions, therefore, each neon indicator lamp is momentarily fired once each cycle at the end of the station period associated with that lamp.

This intermittent illumination of the indicator lamp relating to a particular station period is indicative of the fact that most of the apparatus at that field station is in proper operating condition. The firing of tube 368 at the end of a station period indicates that all of the ten indication pulses have been received from that field station. This means that both the carrier transmitter and carrier receiver at that station are operating properly and that the line wires are in proper condition between the central office and that station. It indicates further that the station counters at the field station are in proper operating condition since otherwise the station would not be transmitting its indication code properly. Thus, the plurality of indicator lamps provides a simple means of obtaining a large amount of information regarding the proper operation of the various field stations.

Having described an electronic code communication system as one specific embodiment of this invention, I desire it to be understood that various other forms may be provided to illustrate the specific embodiment of this invention without in any manner departing from the spirit or scope of the present invention.

What I claim is:

1. In an electronic code communication system of the continuous scanning type including a central office and a plurality of field stations each in communication with said central office over communications circuits, central office apparatus including step demarcating means comprising a repeat type counting chain receiving an input of repetitive pulses and being operated thereby cyclically through all its steps with distinctive outputs being provided for preselected steps, circuit means for transmitting a distinctive station-call pulse to all said field stations each time said step demarcating means is on a particular count, a station counter for demarcating the successive station periods of a cycle, a plurality of delay units being conditioned to be effective one at a time by said station counter at selected times in each cycle, each delay unit when conditioned being effective to provide an input to said station counter when said step demarcating means is on a particular preselected step associated with that particular delay unit, and means at each field station for transmitting a distinctive indication code to said central office during the interval between a preselected successive pair of said station-call pulses received from said central office, whereby varying amounts of loop delay may be accommodated in communicating with the respective field stations and yet the indication code for any field station will be received at the central office within the confines of the respective station period demarcated by said station counter.

2. In an electronic code communication system comprising a central office and a plurality of field stations connected by a communications circuit, central office apparatus comprising means for transmitting a stream of repetitive pulses to all said field stations during each cycle, cyclical pulse counting means for counting said pulses and being effective to form periodically a distinctive station-call pulse in said stream of pulses, station counting means for demarcating successive station periods receiving its input from said pulse counting means, a plurality of delay units being successively gated by said station counting means during each cycle and each being effective when so gated to provide an input count to said station counting means on a particular associated count of said pulse counting means, the station gates thereby provided by said station counter having any of several different preselected phase relationships with respect to said station-call pulses, means at each field station for transmitting distinctive indication code pulses to said central office in response to the pulses received from said central office between a predetermined pair of said station-call pulses, a storage bank at said central office for each of the station periods in a cycle, each of said storage banks being selectively gated by said station counter with the preselected delay being provided to cause each storage bank to be gated to respond to the entire indication code received from a field station on the respective station period and not to the indication code associated with a different station period.

3. In an electronic code communication system comprising a central office and a plurality of field stations connected by a communication circuit, means including pulse demarcating circuit means at said central office for transmitting cycles comprising successive groups of repetitively occurring pulses to all said field stations with each of said groups being designated for a particular one of said stations, group demarcating means at said central office for establishing different successive station gates each having a predetermined phase relationship with respect to the particular group of pulses designated for the respective station, counting circuit means at each field station effective to cause each station to respond only to the group of pulses designated for that station, indication transmitting means at each field station governed by the pulses received from said central office for transmitting a distinctive code of pulses to said central office, storage means at said central office comprising a storage bank for each field station and being selectively rendered responsive by said group demarcating circuit means to said pulses received from the respective field station, said group demarcating means being governed by said pulse demarcating circuit means to have its successive operations each selectively delayed by predetermined amounts with respect to each of said groups to thereby cause each station gate to overlap in time relationship the code pulses received from the respective field station, whereby the code pulses received from each station are effective only on the storage bank at said central office provided for said station.

4. An electronic code communication system of the continuous scanning type comprising a plurality of field stations and a central office connected by a communication circuit, field station apparatus comprising step counting means being at times responsive to input pulses selectively supplied thereto to demarcate successive pulse periods on each of which a distinctive indication pulse is transmitted to the central office, station counting means for counting the successive station periods of a cycle on each of which a particular field station is designated to transmit its indication code to said central office, a bi-stable state electronic device associated with said step counting means, said bi-stable state device receiving an input control from said step counting means when said step counting means is rendered effective by said station conuting means to count said input pulses with said input control being effective to operate said device from its normal condition, said device receiving a different input control from said step counting means when said step counting means has counted its capacity of said input pulses to restore said device to its original state, pulse forming means being governed by said bi-stable state device to be ineffective to provide said input pulses to said step counting means except when said bi-stable state device is operated from its said normal condition, and transmitting means being rendered operable to transmit said indication pulses only when said device is operated from its normal condition.

5. In an electronic code communication system comprising a central office and a plurality of field stations connected by a communication circuit, means at said central office for transmitting successive cycles comprising a group of pulses on each of repeated station periods to all said field stations, station counting means at each field station for demarcating the successive station periods, step counting means at each field station being selectively rendered responsive by said station counting means on a selected station period to count the pulses received from said central office on said station period to thereby demarcate the successive pulse periods, circuit means including a bi-stable device being operated from its normal condition only during the stepping operation of said step counter and being restored to its normal condition upon the completion of said stepping, transmitting means at said field station being governed by said bi-stable device to be inoperative except during the interval said device is operated from its normal condition.

6. An electronic code communication system of the continuous scanning type comprising a plurality of field stations and a central office connected by a communication circuit, field station apparatus comprising step counting means being at times responsive to input pulses selectively supplied thereto to demarcate successive pulse periods on each of which a distinctive indication pulse is transmitted to the central office, station counting means for counting the successive station periods of a cycle on each of which a particular field station is designated to transmit its indication code to said central office, a bi-stable state electronic device associated with said step counting means and being operated from its normal condition only during the time said step counter is effecting its counting operation, means associated with said bi-stable state device for providing an output voltage whenever said device is in its normal condition, a capacitor being charged by said voltage, an electromagnetic relay having its winding connected through its own front contact in parallel with said capacitor, said relay thereby being deenergized if said bi-stable state device is operated from its normal condition for a time considerably in excess of that required for said station to transmit its indications, transmitting circuit means for transmitting said indications to said central office, crcuit means governed by said relay for disabling said transmitting circuit means when said relay drops away, and circuit means including time delay means rendered effective by the dropping away of said relay for shunting said front contact of said relay after a predetermined interval to thereby make possible the reenergization of said relay provided said capacitor has again become charged by said voltage.

7. A continuous scanning electronic code communication system comprising, a plurality of field stations each capable of transmitting an indication code to a central office over a communication circuit during each of continuously repeating cycles, field station apparatus including a station counter being advanced a single count on each successive station period demarcating the time allotted for the transmission of a group of distinctive indication pulses from any field station, pulse forming circuit means being selectively made effective to provide distinctive output pulses, a step counter comprising a repeat type counting chain being rendered active by said station counter on selected station periods and being then effective to demarcate the pulse periods established by said output pulses of said pulse forming means on each of which a distinctive indication pulse can be transmitted to said central office, a bi-stable state device being governed by said step counter to be controlled to one condition when said counter has counted said pulses to its capacity and in the other condition while said step counter is being operated through its various steps, said device acting to disable said pulse forming circuit means whenever said device is in its said one condition, whereby said indication pulses of either kind are transmitted to said central office only during the time following the rendering active of said step counter by said station counters until said step counter has counted its capacity of said pulses provided by said pulse forming circuit means.

8. In an electronic code communication system of the continuous scanning type including a central office and a plurality of field stations each in communication with said central office over communications circuits, central office apparatus including step demarcating means comprising a repeat type counting chain receiving an input of repetitive pulses and being operated thereby cyclically through all its steps with distinctive outputs being provided for preselected steps, circuit means for transmitting a distinctive station-call pulse to all said field stations each time said step demarcating means is on a particular counter, a plurality of delay units each including a cold cathode glow tube, a common anode circuit for all said cold cathode glow tubes in the respective delay units to cause the firing of one of said tubes to extinguish any other tube then conductive, circuit means for each of said cold cathode tubes governed by said station counter to selectively make said cold cathode glow tubes conductive one at a time in sucession at preselected times in each cycle of operation, each delay unit when its cold cathode glow tube is conductive being effective to provide an input pulse to advance said station counter a single step when said step demarcating means is on a particular preselected step associated with that particular delay unit, and means at each field station for transmitting a distinctive indication code to said central office during the interval between a preselected successive pair of said station-call pulses received from said central office, whereby varying amounts of loop delay may be encountered in communicating with the respective field stations and yet the indication code for any field station will be received at the central office within the limits of the respective station period being demarcated by said station counter.

9. A continuous scanning electronic code communication system comprising a plurality of field stations each capable of transmitting an indication code to a central office over a communication circuit during each of continuously repeating cycles, field station apparatus including a station counter being advanced a single count on each successive station period demarcating the time allotted for the transmission of a group of distinctive indication pulses from any field station, pulse forming circuit means being selectively made effective to provide distinctive pulses, a step counter comprising a plurality of cold cathode glow tubes being made conductive one at a time in succesion in response to the pulses provided by said pulse forming means when once rendered active by said station counter on selected station periods to thereby demarcate the successive pulse periods, transmitting circuit means being selectively made effective on each of said pulse periods to transmit a distinctive indication pulse to said central office, a bi-stable state device including a cold cathode glow tube having a common anode circuit with said glow tubes provided in said step counter, biasing circuit means governed by the last cold cathode tube of said step counter for conditioning the cold cathode tube of said bi-stable state device to become conductive in response to a pulse provided by said pulse forming circuit means, said common anode circuit resulting in the extinguishing of any of said cold cathode tubes then conductive upon the firing of any other cold cathode tube provided with said common anode circuit, said cold cathode tube in said bi-stable state device acting to disable said pulse forming circuit means and said transmitting circuit means whenever said tube is in a conductive condition, whereby said indication pulses of either kind are transmitted to said central office only during the interval following the rendering active of said step counter by said station counter and until said step counter has counted its capacity of said pulses provided by said pulse forming circuit means and has thereby caused the firing of said cold cathode tube in said bi-stable state device.

10. In an electronic code communication system of the continuous scanning type including a plurality of field stations and a central office connected over a communication circuit, station counting means at said central office for demarcating the successive station periods in each cycle of operation, station counting means at each field station for conditioning each field station to transmit its indication code comprising a group of distinctive pulses on a predetermined station period, step counting means at said central office being governed by the indication code received on each station period to demarcate the successive pulse periods, a plurality of indicators at said central office one for each station period, circuit means at said central office for applying a voltage pulse to each of said indicators dependent upon the completion of counting by said step counting means on each station period, said indicators being successively gated by said station counting means at said central office to thereby permit said pulse applied simultaneously to all said indicators to operate only the particular indicator associated with the respective station period, whereby the successive operation of all said indicators once each cycle provides an indication of proper operation of the system.

References Cited in the file of this patent

UNITED STATES PATENTS

| | | |
|---|---|---|
| 2,584,739 | Rees | Feb. 5, 1952 |
| 2,629,088 | Kendall | Feb. 17, 1953 |